(12) United States Patent
Blok et al.

(10) Patent No.: US 8,247,494 B2
(45) Date of Patent: Aug. 21, 2012

(54) THERMOSET COMPOSITIONS WITH DISPERSED THERMOPLASTIC RESIN THEREIN AND PROCESS FOR MAKING THEM

(75) Inventors: Edward J. Blok, Wadsworth, OH (US); Maria D. Ellul, Silver Lake Village, OH (US); Sunny Jacob, Seabrook, TX (US); Alfred V. Pickett, Akron, OH (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 12/941,753

(22) Filed: Nov. 8, 2010

(65) Prior Publication Data

US 2011/0124814 A1 May 26, 2011

Related U.S. Application Data

(60) Provisional application No. 61/263,554, filed on Nov. 23, 2009.

(51) Int. Cl.
*C08F 8/00* (2006.01)
*C08L 9/00* (2006.01)
*C08L 23/10* (2006.01)
*C08L 45/00* (2006.01)

(52) U.S. Cl. ......... 525/191; 525/210; 525/232; 525/240

(58) Field of Classification Search .......... 525/191, 525/210, 232, 240
See application file for complete search history.

(56) References Cited

U.S. PATENT DOCUMENTS

| | | | |
|---|---|---|---|
| 4,311,628 A | 1/1982 | Abdou-Sabet et al. | |
| 4,540,753 A | 9/1985 | Cozewith et al. | |
| 4,707,531 A | 11/1987 | Shirahata | |
| 4,803,244 A | 2/1989 | Umpleby | |
| 5,100,947 A | 3/1992 | Puydak et al. | |
| 5,124,212 A | 6/1992 | Lee et al. | |
| 5,157,081 A | 10/1992 | Puydak et al. | |
| 5,290,866 A | 3/1994 | Dobreski et al. | |
| 5,380,770 A | 1/1995 | Doin et al. | |
| 5,397,832 A | 3/1995 | Ellul | |
| 5,476,914 A * | 12/1995 | Ewen et al. | 526/351 |
| 5,672,660 A | 9/1997 | Medsker et al. | |
| 5,936,028 A | 8/1999 | Medsker et al. | |
| 6,169,145 B1 * | 1/2001 | Medsker et al. | 525/100 |
| 6,251,998 B1 | 6/2001 | Medsker et al. | |
| 6,268,438 B1 | 7/2001 | Ellul et al. | |
| 6,342,324 B1 | 1/2002 | Li et al. | |
| 6,451,917 B1 | 9/2002 | Kogure et al. | |
| 6,476,132 B1 | 11/2002 | Abdou-Sabet et al. | |
| 6,491,613 B2 | 12/2002 | Takeda et al. | |
| 6,503,984 B2 | 1/2003 | Johnson et al. | |
| 6,613,185 B1 | 9/2003 | Valade et al. | |
| 6,811,725 B2 | 11/2004 | Nguyen et al. | |
| 6,864,315 B1 | 3/2005 | Hakuta et al. | |
| 6,867,260 B2 | 3/2005 | Datta et al. | |
| 6,884,850 B2 | 4/2005 | Schauder et al. | |
| 6,939,918 B2 | 9/2005 | Ellul et al. | |
| 6,972,309 B1 | 12/2005 | Wideman et al. | |
| 7,271,218 B2 | 9/2007 | Wideman et al. | |
| 7,365,131 B2 * | 4/2008 | Ajbani et al. | 525/191 |
| 7,951,871 B2 | 5/2011 | Blok et al. | |
| 2004/0092643 A1 | 5/2004 | Tiburtius et al. | |
| 2004/0236042 A1 | 11/2004 | Datta et al. | |
| 2005/0107534 A1 | 5/2005 | Datta et al. | |
| 2005/0148727 A1 | 7/2005 | Ajbani et al. | |
| 2006/0293457 A1 | 12/2006 | Nadella et al. | |
| 2009/0050851 A1 | 2/2009 | Sato et al. | |

FOREIGN PATENT DOCUMENTS

| | | |
|---|---|---|
| EP | 0 651 009 | 5/1995 |
| EP | 1 739 127 | 1/2007 |
| JP | 2004-035695 | 2/2000 |
| WO | WO 93/03093 | 2/1993 |
| WO | WO 2007/001601 | 1/2007 |
| WO | WO 2007/035401 | 3/2007 |

OTHER PUBLICATIONS

Benkeser et al. "*Organic Chemistry of Dichlorosilane, Additions to Conjugated and Unconjugated Diene Systems Followed by Intramolecular Cyclizations*", Journal of Organic Chemistry, vol. 44, No. 9, pp. 1370-1376 (1979).

Dewar et al. "*Revised MNDO Parameters for Silicon*", Organometallics vol. 5(2), pp. 375-379 (1986).

Ellul et al. "*Crosslink Densities and Phase Morphologies in Dynamically Vulcanized TPEs*", Rubber Chemistry and Technology, vol. 68, pp. 573-584 (1995).

Lewis et al. "*Hydrosilylation Catalized by Metal Colloids: A Relative Activity Study*", Organometallics, vol. 9, pp. 621-625 (1990).

Lewis "*On the Mechanism of Metal Colloid Catalyzed Hydrosilylation: Proposed Explanations for Electronic Effects and Oxygen Cocatalysts*", J. Am. Chem. Soc., 112, pp. 5998-6004 (1990).

Morton "*Introduction to Polymer Science*", Rubber Technology Third Edition, Chapman & Hall, London, Chapter 1, pp. 11-16 (1995).

Stein et al. "In Situ *Determination of the Active Catalyst in Hydrosilylation Reactions Using Highly Reactive Pt(0) Catalyst Precursors*", Journal of American Chemical Society, vol. 121, pp. 3693-3703 (1999).

Stein et al. "*Mechanistic Studies of Platinum-Catalyzed Hydrosilylation*", J. Inorganic and Organometallic Polymers, vol. 1, No. 3, pp. 325-334, (1991).

Ver Strate et al. "*Near Monodisperse Ethylene-Propylene Copolymers by Direct Zieglert-Natta Polymerization Preparation, Characterization Properties*", Macromolecules, vol. 21, pp. 3360-3371 (1998).

* cited by examiner

*Primary Examiner* — Nathan M Nutter

(74) *Attorney, Agent, or Firm* — Hsin Lin; Leandro Arechederra, III

(57) ABSTRACT

A rubber composition comprising: a cured rubber; and thermoplastic resin, where the thermoplastic resin is in the form of discrete domains dispersed within a continuous phase of the cured rubber, and where the cured rubber includes silicon-containing crosslinks.

17 Claims, 9 Drawing Sheets

MDR Study @ 150°C

MDR @ 200°C

THERMOSET COMPOSITIONS WITH DISPERSED THERMOPLASTIC RESIN THEREIN AND PROCESS FOR MAKING THEM

PRIORITY CLAIM

This application claims priority to U.S. Provisional Patent Application No. 61/263,554, filed Nov. 23, 2009, the disclosure of which is incorporated herein by reference in its entirety.

CROSS REFERENCE TO RELATED APPLICATION

This application is related to U.S. patent Ser. No. 11/595,377, filed Nov. 10, 2006 (2006EM153), the disclosure of which is incorporated herein by reference in its entirety.

FIELD OF THE INVENTION

Embodiments of the invention are directed toward thermoset compositions that include discrete domains of thermoplastic resin dispersed within a thermoset rubber. In particular embodiments, the thermoplastic resin is polypropylene and rubber is a propylene-based rubber that is cured with a non-sterically hindered hydrosilating agent.

BACKGROUND OF THE INVENTION

As is generally known in the art, thermoset rubber compositions, which may also be referred to as vulcanizates, often include reinforcing fillers. These reinforcing fillers provide, among other advantages, strength and toughness to the thermoset composition.

One of the major drawbacks of reinforcing fillers is their negative impact on hysteresis. Some of the negative consequences of higher hysteresis are higher heat build up and higher energy loss. In fact, while reinforcing filler can increase storage modulus (G'), increases in G' due to reinforcing filler are often associated with increase in tan δ. Another major draw back is their negative impact on processing. Higher filler loading is associated with high viscosity.

SUMMARY OF THE INVENTION

Embodiments of this invention are directed toward a rubber composition comprising a cured rubber; and thermoplastic resin, where the thermoplastic resin is in the form of discrete domains dispersed within a continuous phase of the cured rubber, and where the cured rubber includes silicon-containing crosslinks.

Other embodiments are directed toward a process for forming a thermoset composition, the process comprising the steps of (i) combining polypropylene, a propylene-based elastomer, a hydrosilating agent, and a catalyst for the hydrosilating agent to form a crosslinkable mixture; and (ii) activating the hydrosilating agent to crosslink the propylene-based elastomer, where the propylene-based elastomer includes at least 5% and up to 35% ethylene-derived units and at least 0.5% and up to 11% diene-derived units, and where the propylene-based elastomer is characterized by a heat of fusion (ASTM E 793) of less than 80 J/g and a melting temperature of less than 110° C., where the polypropylene has a melting temperature that is greater than 110° C. and a heat of fusion (ASTM E 793) of greater than 80 J/g, and where the hydrosilating agent is a compound including at least 3 silicon hydride groups defined by the formula:

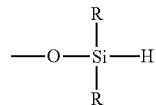

where each R is independently a monovalent organic group or hydrogen, and where the silicon atoms of the respective silicon hydride groups are spatially separated by at least 6 atoms, to thereby form a thermoset composition including discrete domains of polypropylene dispersed within a continuous phase of the crosslinked rubber.

Still other embodiments are directed toward A process for forming a thermoset composition, the process comprising the steps of: (i) combining thermoplastic resin, rubber, a hydrosilating agent, and a catalyst for the hydrosilating agent to form a crosslinkable mixture; and (ii) activating the hydrosilating agent to crosslink the rubber to thereby form a thermoset composition including discrete domains of thermoplastic resin dispersed within a continuous phase of the crosslinked rubber.

DETAILED DESCRIPTION OF ILLUSTRATIVE EMBODIMENTS

Figure 1:
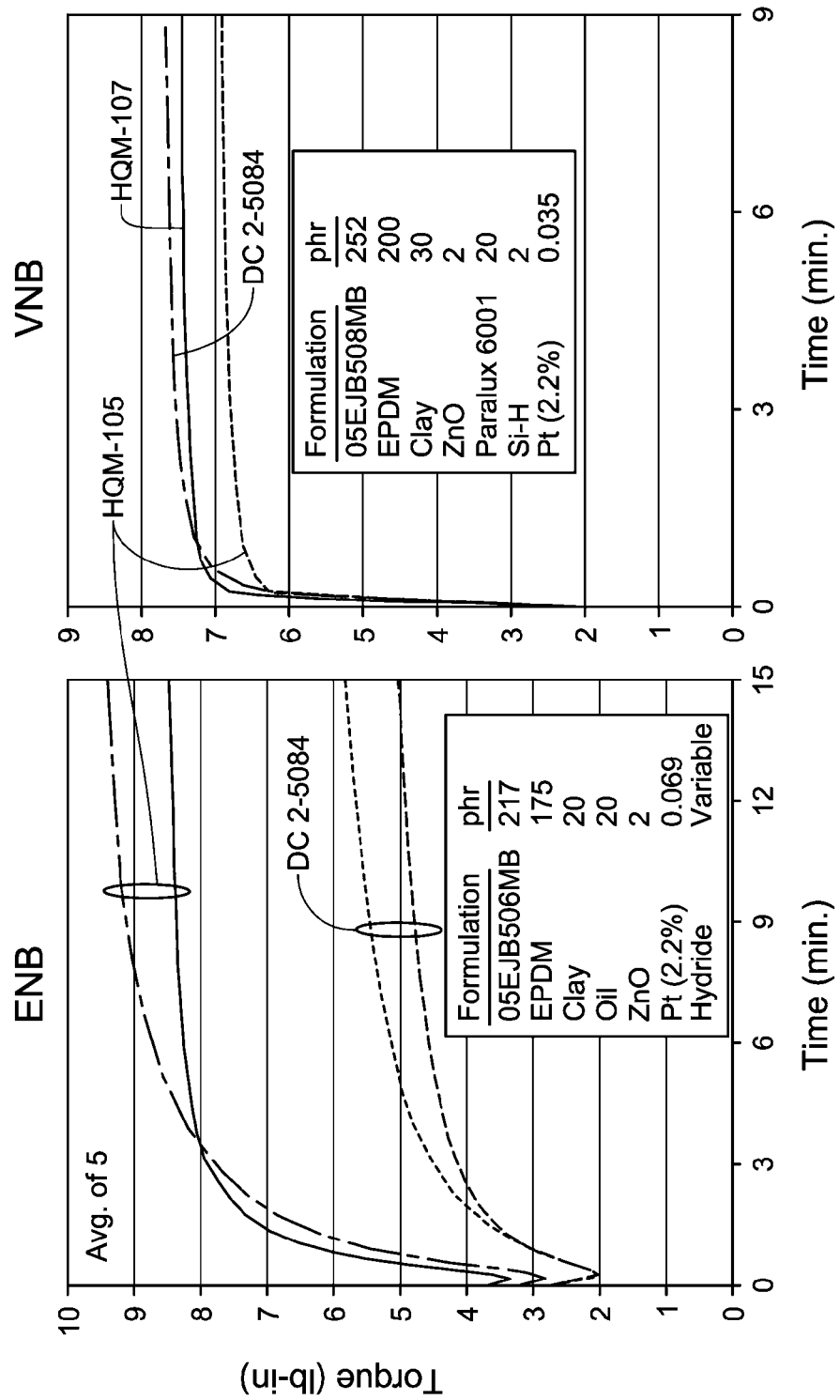
FIG. 1 depicts moving die rheometer (MDR) Max Torque at 200° C. for ENB-EPDM and VNB-EPDM compositions.
Figure 2:
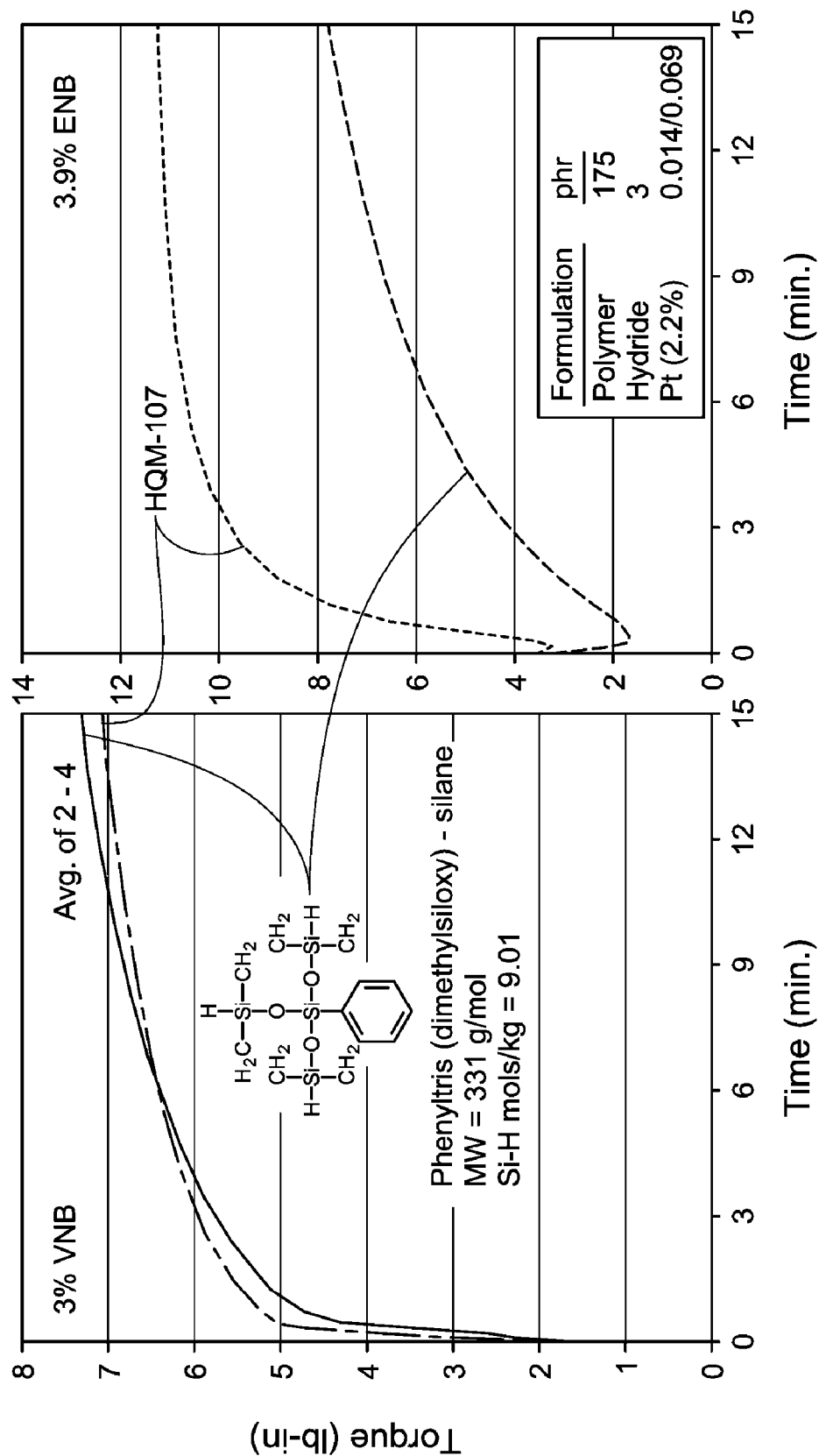
FIG. 2 depicts MDR Max Torque at 150° C. for VNB and ENB compositions.
Figure 3:
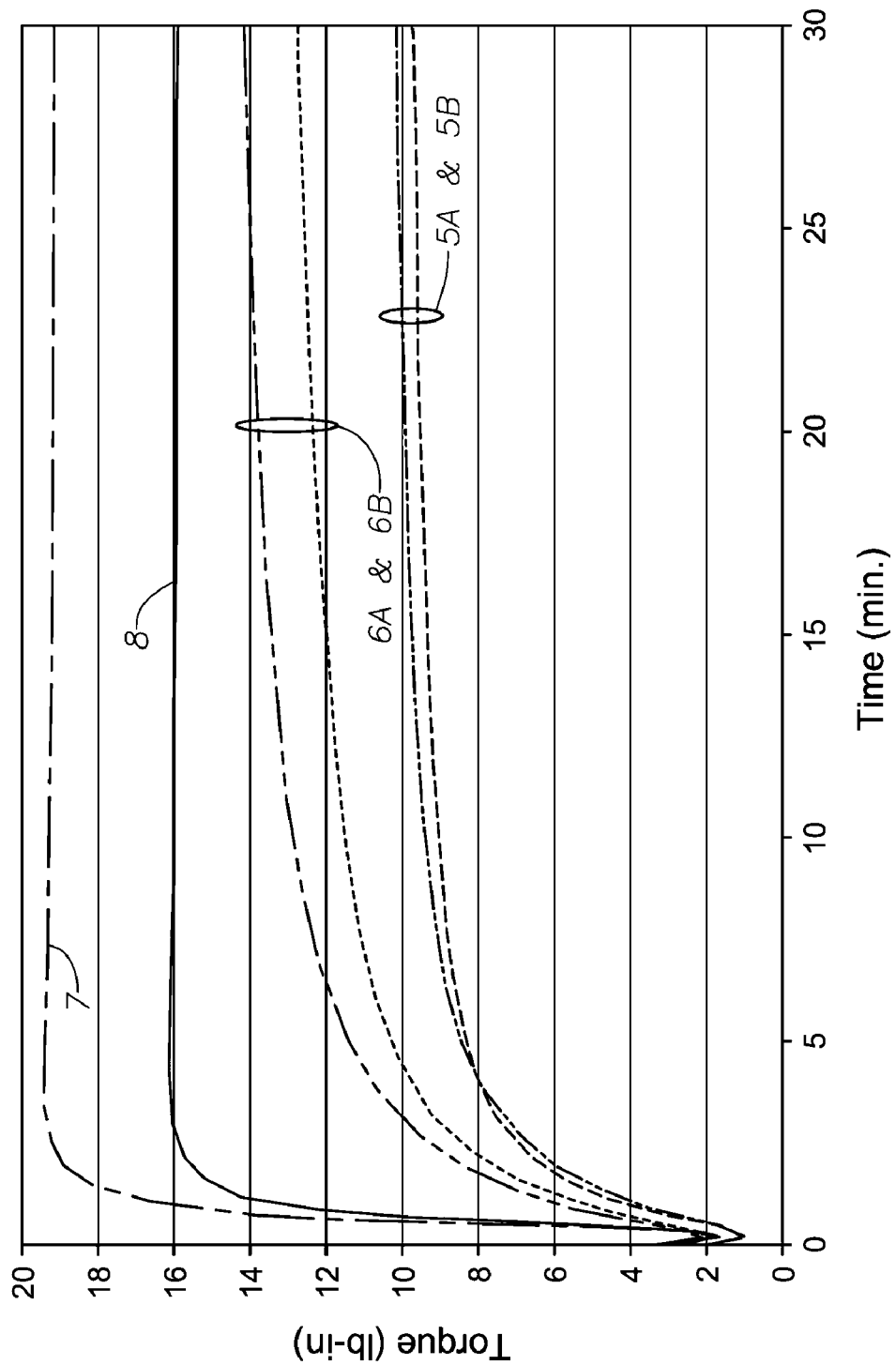
FIG. 3 depicts MDR Max Torque at 200° C. for Examples 5A, 5B, 6A, 6B, 7 and 8.
Figure 4:
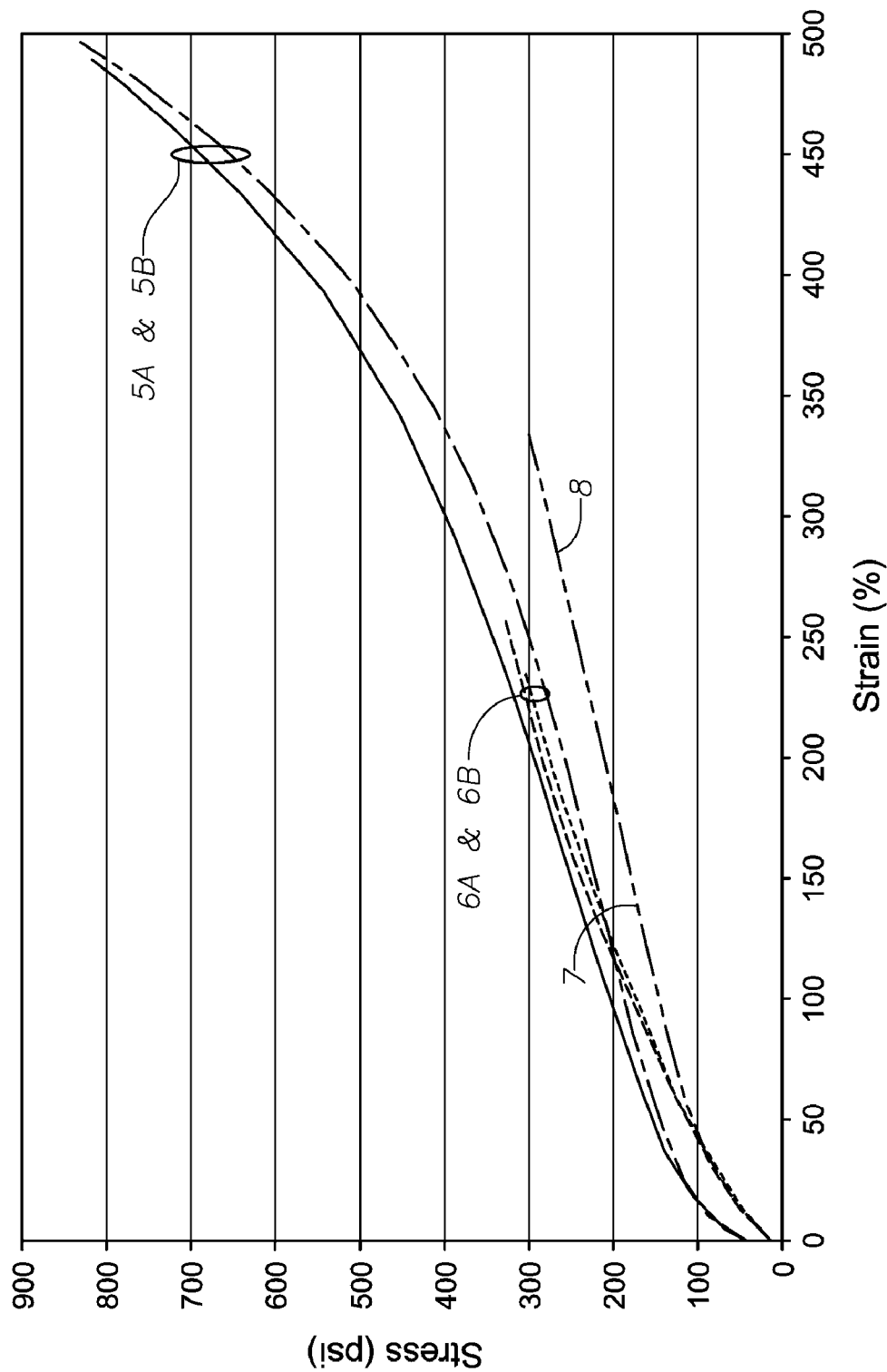
FIG. 4 depicts stress/strain curves for Examples 5A, 5B, 6A, 6B, 7 and 8.
Figure 5:
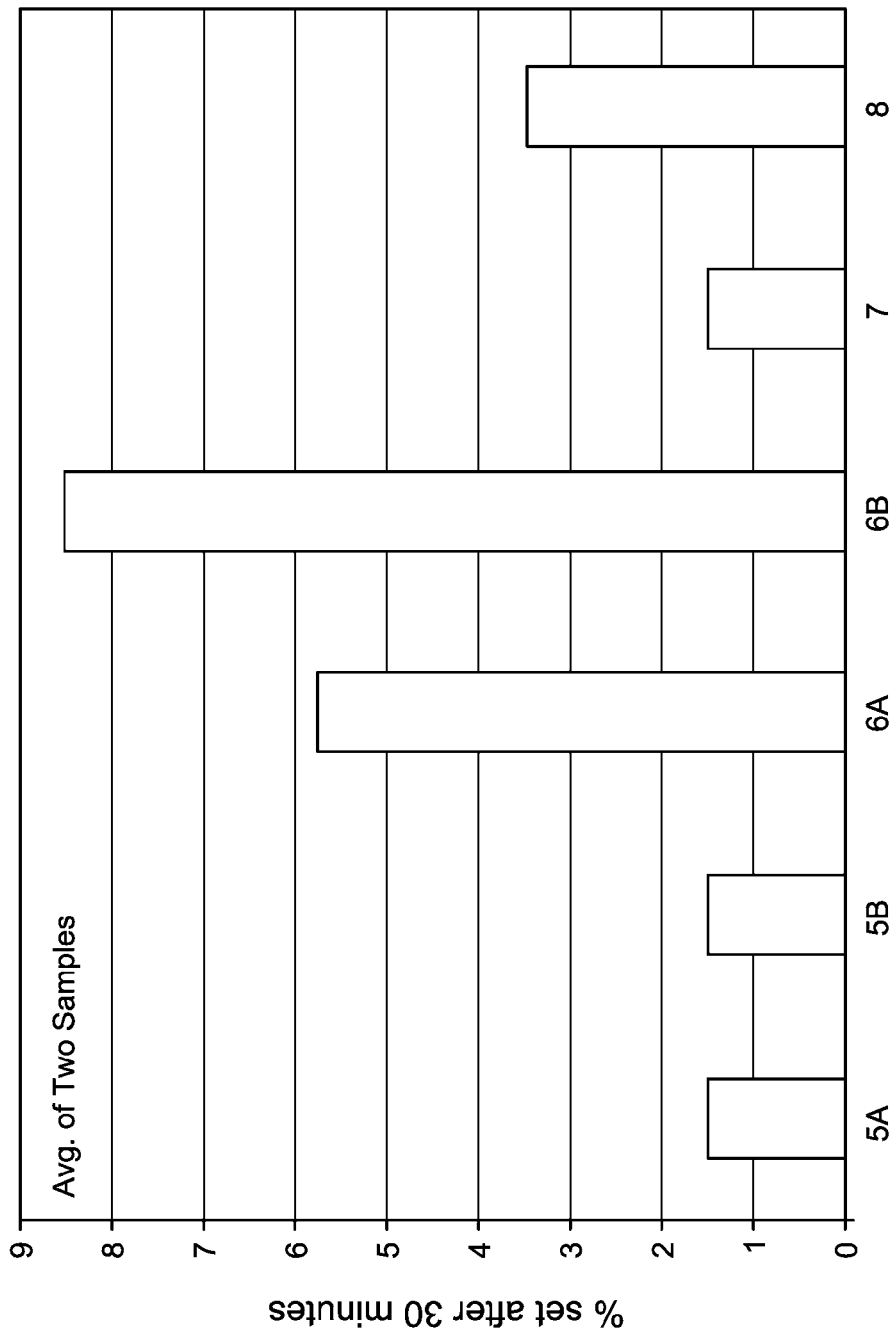
FIG. 5 depicts aged tension set, 70 hours at 110° C., 25% strain, for Examples 5A, 5B, 6A, 6B, 7 and 8.
Figure 6:
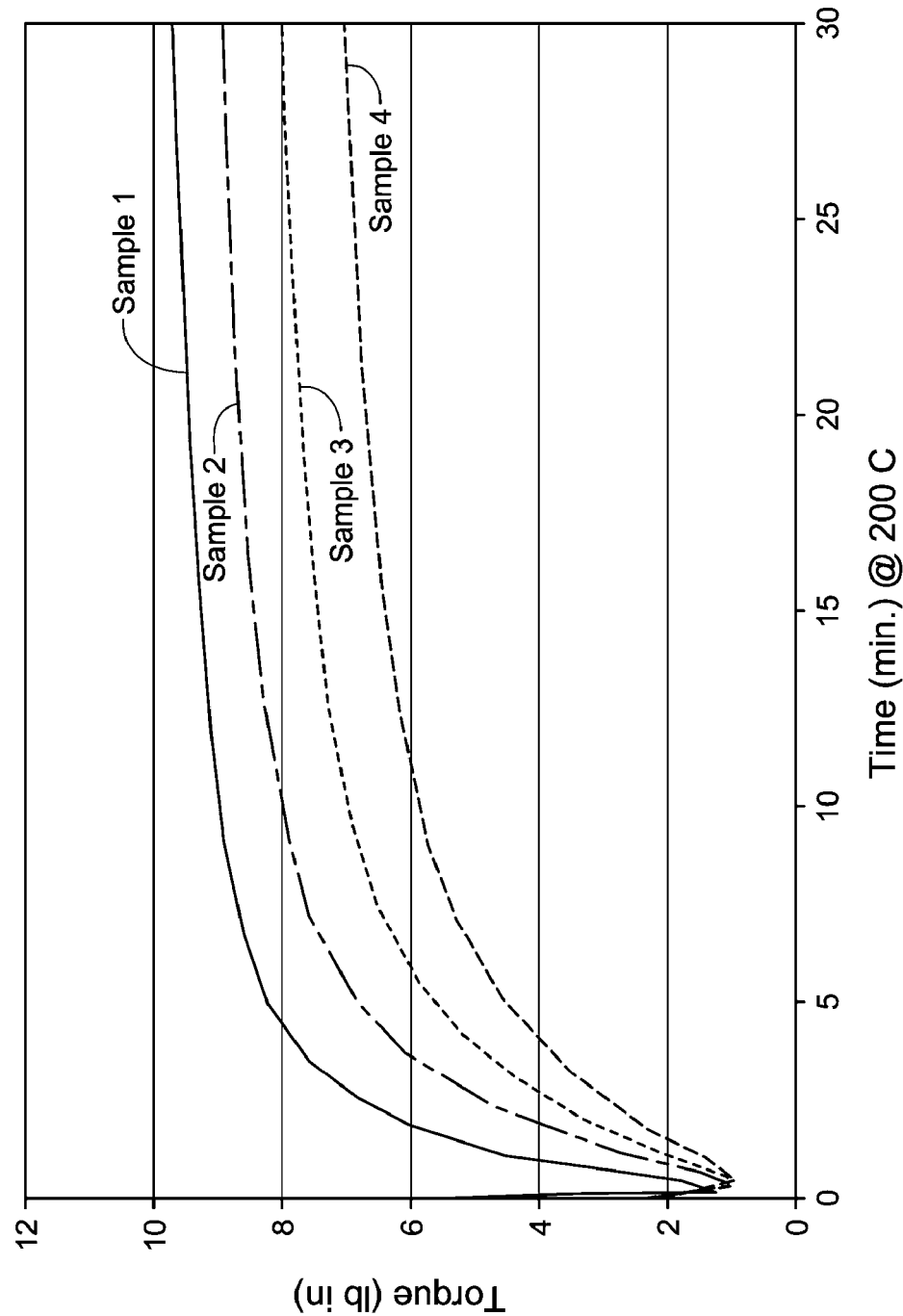
FIG. 6 depicts MDR Max Torque at 200° C. for Samples 1-4.
Figure 7:
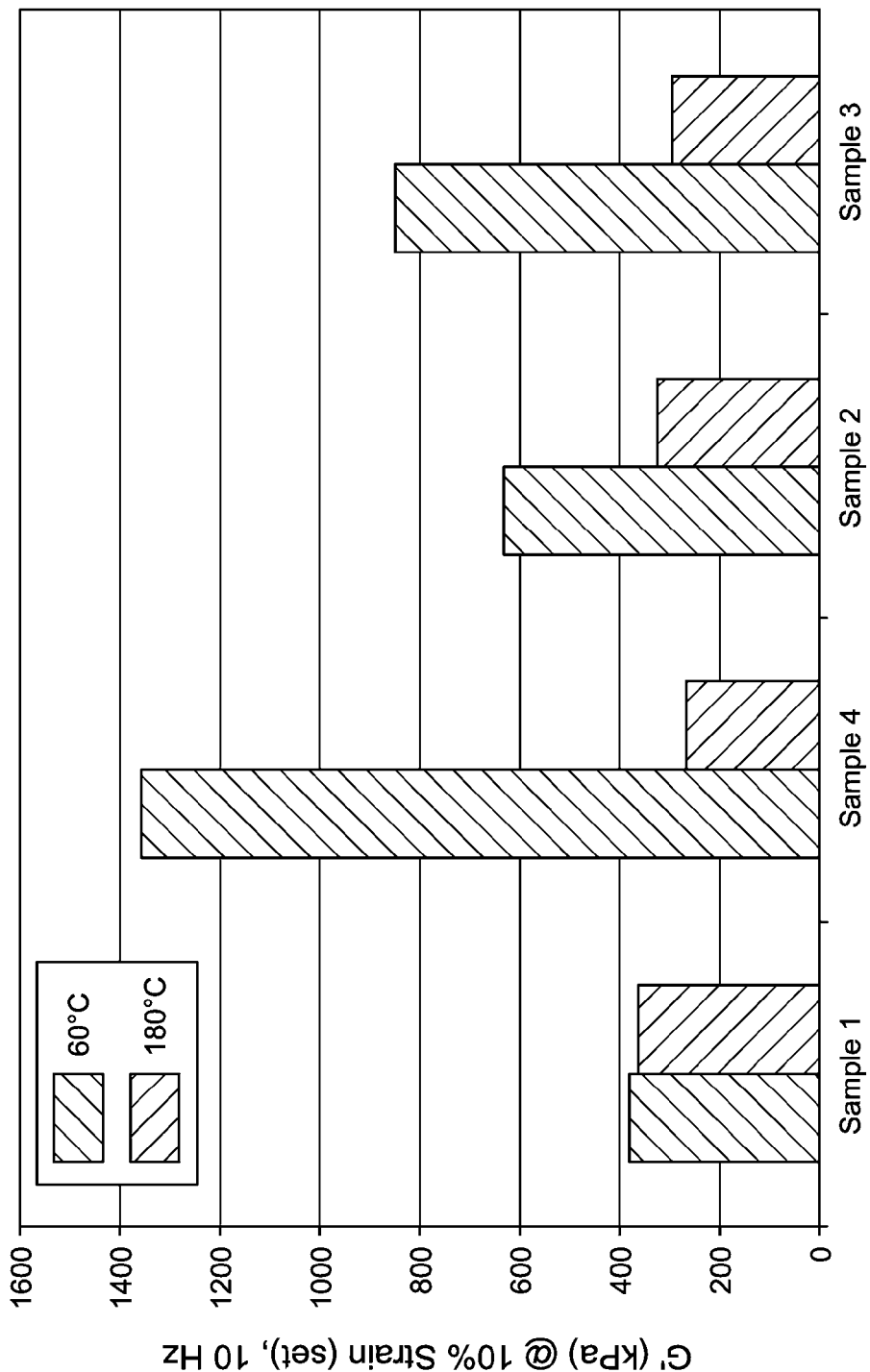
FIG. 7 depicts post cure storage modulus (G') (kPa), 180° C. and 60° C., for Samples 1-4.
Figure 8:
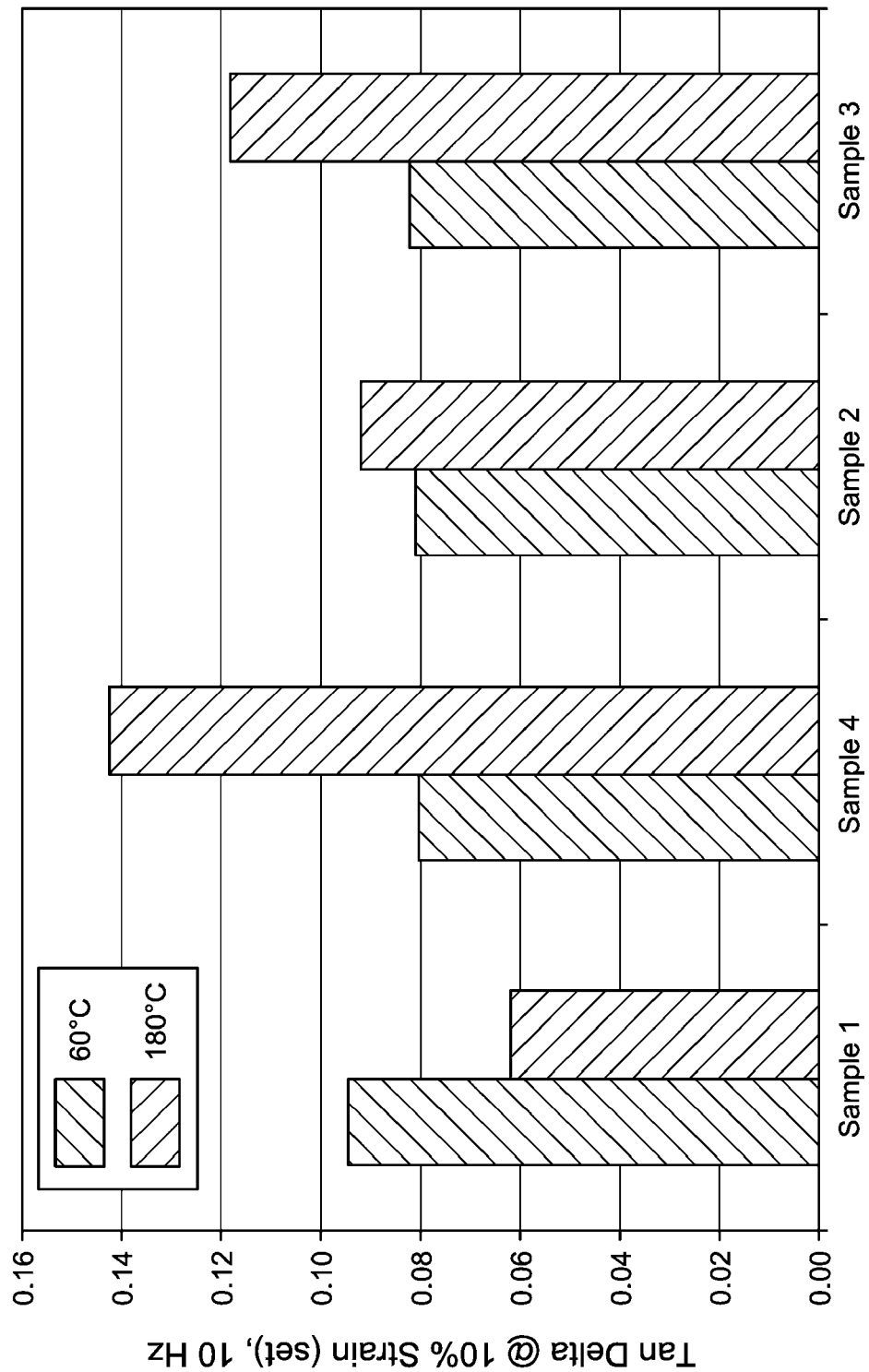
FIG. 8 depicts post cure tan δ, at 180° C. and 60° C., for Samples 1-4.
Figure 9:
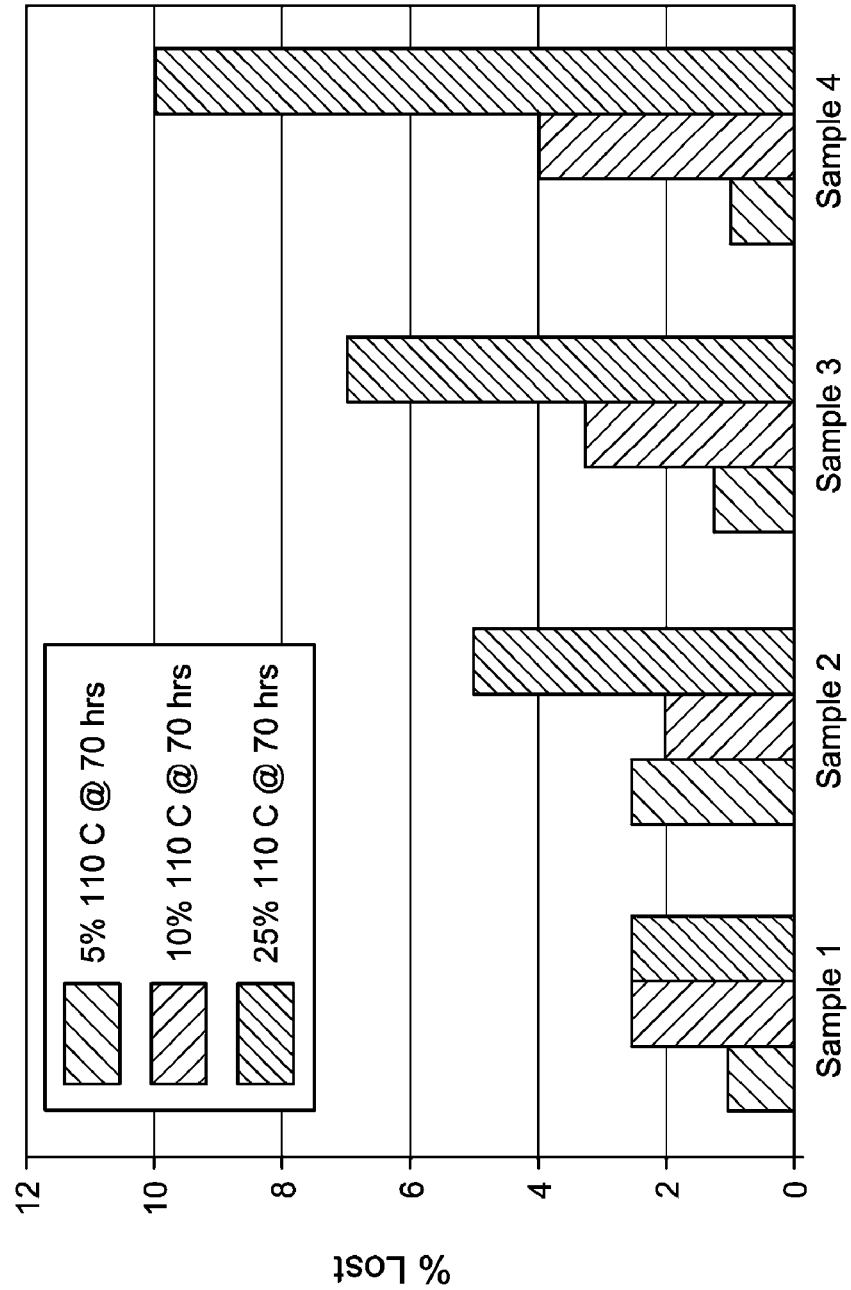
FIG. 9 depicts aged tension set, 22 hours at 7° C., 25% strain, for Samples 1-4.

One or more embodiments of the present invention based on the discovery that technologically useful thermoset compositions including discrete domains of polypropylene dispersed throughout the thermoset rubber can be prepared by crosslinking the rubber with a silicon-containing curative. While polypropylene may be dispersed throughout olefin-based rubber compositions without dispersability or incompatibility difficulties, peroxide curatives have a deleterious impact on the polypropylene; for example, chain scission of the polypropylene occurs. Where sulfur-base curatives are employed, odor and discoloration of the thermoset can be problematic.

Embodiments of the present invention are directed toward thermoset compositions with discrete domains of thermoplastic resin dispersed therein. In one or more embodiments, the thermoset is a rubber crosslinked with a silicon-containing curative, which advantageously provides for effective crosslinking of the rubber without a deleterious impact on the thermoplastic material. In particular embodiments, the rubber is an olefinic rubber and the thermoplastic is a polyolefin, which advantageously provides a compatible interface between the rubber phase and the plastic phase. In particular embodiments, the rubber is cured with a non-sterically hindered silicon-containing curative, which provides for a technologically useful cure at relatively low curative and catalyst loadings especially where conventional olefinic rubbers are employed.

In one or more embodiments, the compositions of this invention include a continuous rubber phase with discrete domains of thermoplastic resin dispersed therein. The discrete domains of thermoplastic resin exist at temperatures below the melting point of the thermoplastic resin. Where the temperature of the composition is above the melting point of the thermoplastic resin, a co-continuous morphology may exist; i.e., the thermoplastic resin may be co-continuous with the continuous rubber phase. Unless otherwise specified, any description of the morphology of the composition of this invention is at standard conditions of temperature and pressure, which are below the melt temperature of the thermoplastic resin. In this respect, reference may also be made to the solid particles or domains of the thermoplastic resin.

In one or more embodiments, the continuous rubber phase is thermoset. In particular embodiments, the rubber is at least 80%, in other embodiments at least 90%, in other embodiments at least 95%, and in other embodiments at least 99% cured, which refers to a percentage of cure that the rubber is capable of achieving as observed by a cure curve, such as may be obtained using a cure analyzer that measures torque as a function of cure.

In one or more embodiments, the continuous rubber phase includes silicon-containing crosslinks, which refers to substituents chemically bonded between 2 or more polymeric chains of the rubber, which may thereby form an infinite network within the rubber phase. These substituents chemically bonded between 2 or more polymer chains (i.e., crosslinks) may contain at least 2, and in other embodiments at least 3, silicon atoms per crosslink. Where the crosslink includes at least 2 silicon atoms, the silicon atoms in certain embodiments may be separated by at least 6 atoms (i.e., there are at least 5 non-silicon atoms between the 2 silicon atoms). In particular embodiments, each silicon atom in a crosslink is separated by at least 6 non-silicon atoms.

In one or more embodiments, the thermoset compositions of the present invention may include an amount of thermoplastic resin (e.g. polypropylene) up to that amount that the thermoplastic resin is no longer a discrete discontinuous phase. In one or more embodiments, the compositions may include greater than 3 parts, in other embodiments greater than 5 parts, in other embodiments greater than 10 parts, and in other embodiments greater than 20 parts by weight thermoplastic resin, per 100 parts by weight rubber. In these or other embodiments, the thermoset compositions of the present invention may include less than 60 parts, in other embodiments less than 50 parts, in other embodiments less than 40 parts, and in other embodiments less than 30 parts by weight thermoplastic resin, per 100 parts by weight rubber. In one or more embodiments, the thermoset compositions of the present invention include from about 5 to about 50 parts by weight, or in other embodiments from about 10 to about 40 parts by weight thermoplastic resin, per 100 parts by weight rubber.

In one or more embodiments, the compositions of the present invention may include an oil dispersed throughout the rubber phase. In other embodiments, the oil is dispersed throughout the plastic phase. And in other embodiments, the oil is dispersed throughout the rubber and plastic phase. In one or more embodiments, the compositions of the present invention may include greater than 1 part, in other embodiments greater than 3 parts, and in other embodiments greater than 10 parts by weight oil per 100 parts by weight rubber. In these or other embodiments, the compositions may include less than about 50 parts, in other embodiments less than about 40 parts, and in other embodiments less than about 30 parts by weight oil per 100 parts by weight rubber. In one or more embodiments, the compositions may include from about 1 to about 50 parts by weight, or in other embodiments from about 5 to about 40 parts by weight oil per 100 parts by weight rubber.

In one or more embodiments, the rubber is an olefinic rubber. Examples of olefinic rubbers include ethylene-propylene rubber, ethylene-based plastomer, and propylene-based rubbers.

The term ethylene-propylene rubber refers to rubbery copolymers polymerized from ethylene, at least one α-olefin monomer, and optionally at least one diene monomer. The α-olefins may include, but are not limited to, propylene, 1-butene, 1-hexene, 4-methyl-1-pentene, 1-octene, 1-decene, or combinations thereof. In one embodiment, the α-olefins include propylene, 1-hexene, 1-octene or combinations thereof. The diene monomers may include, but are not limited to, 5-ethylidene-2-norbornene; 5-vinyl-2-norbornene; divinyl benzene; 1,4-hexadiene; 5-methylene-2-norbornene; 1,6-octadiene; 5-methyl-1,4-hexadiene; 3,7-dimethyl-1,6-octadiene; 1,3-cyclopentadiene; 1,4-cyclohexadiene; dicyclopentadiene; or a combination thereof. In the event that the copolymer is prepared from ethylene, α-olefin, and diene monomers, the copolymer may be referred to as a terpolymer or even a tetrapolymer in the event that multiple α-olefins or dienes are used.

In one or more embodiments, the ethylene-propylene rubber includes from about 12 to about 85% by weight, or from about 20 to about 80% by weight, or from about 40 to about 70% by weight, or from about 60 to about 66% by weight ethylene units deriving from ethylene monomer, and from about 0.1 to about 15% by weight, or from about 0.5 to about 12% by weight, or from about 1 to about 10% by weight, or from about 2 to about 8% by weight diene units deriving from diene monomer, with the balance including α-olefin units deriving from α-olefin monomer (e.g., $C_3$-$C_{10}$ olefins such as propylene). Expressed in mole percent, the terpolymer of one embodiment includes from about 0.1 to about 5 mole percent, or from about 0.5 to about 4 mole percent, or from about 1 to about 2.5 mole percent diene units deriving from diene monomer. In one or more embodiments, where the diene includes 5-ethylidene-2-norbornene, the ethylene-propylene rubber may include at least 1% by weight, in other embodiments at least 3% by weight, in other embodiments at least 4% by weight, in other embodiments at least 5% by weight, in other embodiments from about 1 to about 15% by weight, in other embodiments from about 5% to about 12% by weight, and in other embodiments from about 7% to about 11% by weight units deriving from 5-ethylidene-2-norbornene.

In one or more embodiments, ethylene-propylene rubber may have a weight average molecular weight ($M_w$) that is greater than 100,000 g/mole, in other embodiments greater than 200,000 g/mole, in other embodiments greater than 400,000 g/mole, and in other embodiments greater than 600,000 g/mole; in these or other embodiments, the Mw of the ethylene-propylene rubber is less than 1,200,000 g/mole, in other embodiments less than 1,000,000 g/mole, in other embodiments less than 900,000 g/mole, and in other embodiments less than 800,000 g/mole. In one or more embodiments, useful ethylene-propylene rubbers have a number average molecular weight ($M_n$) that is greater than 20,000 g/mole, in other embodiments greater than 60,000 g/mole, in other embodiments greater than 100,000 g/mole, and in other embodiments greater than 150,000 g/mole; in these or other embodiments, the $M_w$ of the ethylene-propylene rubbers of one or more embodiments is less than 500,000 g/mole, in other embodiments less than 400,000 g/mole, in other embodiments less than 300,000 g/mole, and in other embodiments less than 250,000 g/mole. Techniques for determining the molecular weight ($M_n$, $M_w$ and $M_z$) and molecular weight distribution (MWD) may be found in U.S. Pat. No. 4,540,753 (Cozewith, Ju and Ver Strate) (which is incorporated by reference herein for purposes of U.S. practices) and references cited therein and in Macromolecules, 1988, volume 21, p 3360 (Ver Strate et al.), which is herein incorporated by reference for purposes of U.S. practices, and references cited therein.

In one or more embodiments, ethylene-propylene rubber may also be characterized by having a Mooney viscosity ($ML_{(1+4)}$ at 125° C.) per ASTM D-1646, of from about 10 to about 500 or from about 50 to about 450.

In one or more embodiments, ethylene-propylene rubber may be characterized by having an intrinsic viscosity, as measured in Decalin at 135° C. per ASTM D-1601, of from about 1 to about 8 dl/g, or from about 3 to about 7 dl/g, or from about 4 to about 6.5 dl/g.

In one or more embodiments, the ethylene-propylene rubber may be characterized by a glass transition temperature ($T_g$), as determined by Differential Scanning calorimetry (DSC) according to ASTM E 1356, that is less than −20° C., in other embodiments less than −30° C., in other embodiments less than −50° C., and in other embodiments from about −20 to about −60° C.

Ethylene-propylene rubber may be manufactured or synthesized by using a variety of techniques. For example, these copolymers can be synthesized by employing solution, slurry, or gas phase polymerization techniques that employ various catalyst systems including Ziegler-Natta systems including vanadium catalysts and take place in various phases such as solution, slurry, or gas phase. Exemplary catalysts include single-site catalysts including constrained geometry catalysts and Group IV-VI metallocenes, and Brookhart catalysts. Elastomeric copolymers are commercially available under the tradenames Vistalon™ (ExxonMobil Chemical Co.; Houston, Tex.), Keltan™ (DSM Copolymers; Baton Rouge, La.), Nordel™ IP (DuPont Dow Elastomers; Wilmington, Del.), NORDEL MG™ (DuPont Dow Elastomers), Royalene™ (Chemtura) and Buna™ (Lanxess).

In one or more embodiments, the ethylene-based plastomers, which may also be referred to as ethylene-α-olefin copolymers, include copolymers of ethylene and one or more α-olefin comonomers. The α-olefin comonomers may include 1-butene, 1-hexene, 1-octene, 1-nonene, 1-decene, 4-methyl-1-pentene, and mixtures thereof.

In one or more embodiments, the ethylene-α-olefin copolymers may include at least 15 weight percent, in other embodiments at least 30 weight percent, and in other embodiments at least 50 weight percent units deriving from the α-olefin comonomer based upon the total weight of the copolymer. In these or other embodiments, the ethylene-α-olefin copolymers may include less than 55 weight percent, in other embodiments less than 45 weight percent, and in other embodiments less than 40 weight percent units deriving from the α-olefin comonomer based upon the total weight of the copolymer.

In one or more embodiments, the ethylene-α-olefin copolymer may be characterized by a density, as determined at room temperature per ASTM D-792, that is less than 0.900 g/cc, in other embodiments less than 0.870 g/cc, in other embodiments less than 0.865 g/cc, and in other embodiments less than 0.860 g/cc; in these or other embodiments, the ethylene-α-olefin copolymers may be characterized by a density of at least 0.850 g/cc, and in other embodiments at least 0.860 g/cc.

In one or more embodiments, the ethylene-α-olefin copolymers may be characterized by a $T_g$, as determined by DSC, that is less than −20° C., in other embodiments less than −30° C., in other embodiments less than −50° C., and in other embodiments from about −20° C. to about −60° C.

In one or more embodiments, the ethylene-α-olefin copolymer can have a melt index, according to ASTM 1238 using 2.16 kg load at 190° C., of less than 100 dg/min, in other embodiments less than 50 dg/min, in other embodiments less than 35 dg/min, in other embodiments less than 15 dg/min, and in other embodiments from about 0.1 to about 100 dg/min.

In one or more embodiments, the ethylene-α-olefin copolymers may be characterized by a narrow compositional distribution breadth index, as determined by using the procedure set forth in WO 93/03093, above 60%, in other embodiments above 75%, and in other embodiments above 90%.

In one or more embodiments, the propylene-based rubbery copolymer, which may also be referred to as propylene-α-olefin copolymers, include units (i.e., mer units) derived from propylene, one or more comonomer units derived from ethylene or α-olefins including from 4 to about 20 carbon atoms, and optionally one or more comonomer units derived from dienes. In one or more embodiments, the α-olefin comonomer units may derive from ethylene, 1-butene, 1-hexane, 4-methyl-1-pentene and/or 1-octene. In one or more embodiments, the diene comonomer units may derive from 5-ethylidene-2-norbornene, 5-vinyl-2-norbornene, divinyl benzene, 1,4-hexadiene, 5-methylene-2-norbornene, 1,6-octadiene, 5-methyl-1,4-hexadiene, 3,7-dimethyl-1,6-octadiene, 1,3-cyclopentadiene, 1,4-cyclohexadiene, dicyclopentadiene, or a combination thereof. The embodiments described below are discussed with reference to ethylene as the α-olefin comonomer, but the embodiments are equally applicable to other copolymers with other α-olefin comonomers. In this regard, the copolymer may simply be referred to as propylene-based rubbery copolymers with reference to ethylene as the α-olefin.

In one or more embodiments, the propylene-based rubbery copolymers may include at least 5% by weight, in other embodiments at least 6% by weight, in other embodiments at least 8% by weight, and in other embodiments at least 10% by weight ethylene-derived units; in these or other embodiments, the copolymers may include up to 35% by weight, in other embodiments up to 32% by weight, in other embodiments up to 25% by weight, and in other embodiments up to 20% by weight ethylene-derived units, where the percentage by weight is based upon the total weight of the propylene-derived, α-olefin derived units, and diene-derived units. Stated another way, the propylene-based rubbery copolymers may include at least 75% by weight, or in other embodiments at least 80% by weight, propylene-derived units; and in these or other embodiments, the copolymers may include up to 95% by weight, in other embodiments up to 94% by weight, in other embodiments up to 92% by weight, and in other embodiments up to 90% by weight propylene-derived units, where the percentage by weight is based upon the total weight of the propylene-derived, and diene derived mer units.

In one or more embodiments, the propylene-based rubbery copolymers may include at least 0.5% by weight, in other embodiments at least 1.5% by weight, and in other embodiments at least 3% by weight diene-derived units; in these or other embodiments, the propylene-based rubbery copolymers may include up to 11% by weight, in other embodiments up to 6% by weight, and in other embodiments up to 4% by weight diene-derived units, where the percentage by weight is based upon the total weight of the propylene-derived, ethylene-derived, and diene-derived units.

The propylene-based rubbery copolymers in one or more embodiments of this invention are characterized by having a single melting temperature as determined by differential scanning calorimetry (DSC). The melting point is defined as the temperature of the greatest heat absorption within the range of melting of the sample. The propylene-based rubbery copolymer may show secondary melting peaks adjacent to the principal peak, but for purposes herein, these secondary melting peaks are considered together as a single melting point, with the highest of these peaks being considered the melting point ($T_m$) of the propylene-based rubbery copolymer. In one or more embodiments, the $T_m$ of the propylene-based rubbery copolymer is less than 110° C., in other embodiments less than 90° C., in other embodiments less than 80° C., and in other embodiments less than 70° C.; in these or other embodiments, the propylene-based rubbery copolymer has a $T_m$ of at least 25° C., in other embodiments at least of 35° C., in other embodiments at least of 40° C., and in other embodiments at least of 45° C.

In one or more embodiments, the propylene-based rubbery copolymer may be characterized by a heat of fusion (Hf), as determined according to DSC procedures according to ASTM E 793. This may be determined by placing 6 to 10 mg of sample into DSC equipment and heating the sample at about 10° C./min. In one or more embodiments, the propylene-based rubbery copolymer may be characterized by a heat of fusion that is at least 0.5 J/g, in other embodiments at least 1.0 J/g, in other embodiments at least 1.5 J/g, in other embodiments at least 3.0, in other embodiments at least 4.0, in other embodiments at least 6.0, and in other embodiments at least 7.0. In these or other embodiments, the propylene-based rubbery copolymer may be characterized by a heat of fusion that is less than 80 J/g, in other embodiments less than 70 J/g, in other embodiments less than 60 J/g, in other embodiments less than 50 J/g, in other embodiments less than 40 J/g, in other embodiments up to 40 J/g, and in other embodiments less than 30 J/g.

The propylene-based rubbery copolymer can have a triad tacticity of three propylene units, as measured by $^{13}$C NMR, of 75% or greater, 80% or greater, 82% or greater, 85% or greater, or 90% or greater. In one or more embodiments, ranges include from about 50 to about 99%, in other embodiments from about 60 to about 99%, in other embodiments from about 75 to about 99%, in other embodiments from about 80 to about 99%, and in other embodiments from about 60 to about 97%. Triad tacticity is determined by the methods described in U.S. Patent Application Publication No. 2004/0236042.

In one or more embodiments, the propylene-based rubbery copolymer may have a % crystallinity of from 0.5% to 40%, in other embodiments 1% to 30%, and in other embodiments 5% to 25%. Crystallinity may be determined according to DSC procedures in accordance with ASTM E-794-95. This may be determined by placing 6 to 10 mg of sample into DSC equipment and heating the sample at about 10° C./min. For use herein, the crystallinity of the propylene-ethylene polymer can also be expressed in terms of percentage of crystallinity. The thermal energy for the highest order of polypropylene is estimated at 209 J/g (i.e., 100% crystallinity is equal to 209 J/g). In other embodiments, the propylene-ethylene polymer may have a crystallinity of less than 40%, in other embodiments about 0.25% to about 25%, in other embodiments from about 0.5% to about 22%, and in other embodiments from about 0.5% to about 20%.

In one or more embodiments, the propylene-based rubbery copolymer can have a density of about 0.85 g/cm$^3$ to about 0.92 g/cm$^3$, in other embodiments about 0.87 g/cm$^3$ to 0.90 g/cm$^3$, and in other embodiments from about 0.88 g/cm$^3$ to about 0.89 g/cm$^3$ at room temperature as measured per the ASTM D-792 test method.

In one or more embodiments, the propylene-based rubbery copolymer can have an melt index (MI) (ASTM D-1238, 2.16 kg @ 190° C.) of less than 10 dg/min, in other embodiments ≦6.5 dg/min, in other embodiments ≦6 dg/min, in other embodiments ≦5.5 dg/min, and in other embodiments ≦5 dg/min.

In one or more embodiments, the propylene-based rubbery copolymer can have a melt flow rate (MFR), as measured according to the ASTM D-1238, 2.16 kg weight @ 230° C., equal to or greater than 0.2 dg/min, in other embodiments of at least 0.2 dg/min, in other embodiments at least 0.5 dg/min, and in other embodiments at least 1.0 dg/min. In these or other embodiments, the melt flow rate may be equal to or less than 350 dg/min, and in other embodiments less than 100 dg/min. In an embodiment, the propylene-based polymer has MFR of 0.5 dg/min to 350 dg/min, in other embodiments from 2 dg/min to 30 dg/min, in other embodiments from 5 dg/min to 30 dg/min, in other embodiments 10 dg/min to 30 dg/min, and in other embodiments 10 dg/min to about 25 dg/min.

In one or more embodiments, the propylene-based rubbery copolymers may have a Mooney viscosity [ML(1+4) @ 125° C.], as determined according to ASTM D-1646, of less than 100, in other embodiments less than 75, in other embodiments less than 60, and in other embodiments less than 30.

In one or more embodiments, the propylene-based rubbery copolymer can have a $M_w$ of about 5,000 to about 5,000,000 g/mole, in other embodiments a $M_w$ of about 10,000 to about 1,000,000 g/mole, in other embodiments a $M_w$ of about 20,000 to about 500,000, g/mole and in other embodiments a $M_w$ of about 50,000 to about 400,000 g/mole.

In one or more embodiments, the propylene-based rubbery copolymer can have a $M_n$ of about 2,500 to about 2,500,000 g/mole, in other embodiments a $M_n$ of about 5,000 to about 500,000 g/mole, in other embodiments a $M_n$ of about 10,000 to about 250,000 g/mole, and in other embodiments a $M_n$ of about 25,000 to about 200,000 g/mole.

In one or more embodiments, the propylene-based rubbery copolymer can have a Z-average molecular weight ($M_z$) of about 10,000 to about 7,000,000 g/mole, in other embodiments a $M_z$ of about 50,000 to about 1,000,000 g/mole, in other embodiments a $M_z$ of about 80,000 to about 700,000 g/mole, and in other embodiments a $M_z$ of about 100,000 to about 500,000 g/mole.

In one or more embodiments, the molecular weight distribution index (MWD=($M_w/M_n$)) of the propylene-based rubbery copolymer may be about 1 to about 40, in other embodiments about 1 to about 5, in other embodiments about 1.8 to about 5, and in other embodiments about 1.8 to about 3.

Useful thermoplastic resins that may be used in preparing the thermoset composition of this invention may include solid, generally high molecular weight plastic resins. In one or more embodiments, these thermoplastic resins include unfunctionalized resins. In other embodiments, the thermoplastic component of the thermoset compositions may include a functionalized thermoplastic resin either alone or in combination with an unfunctionalized resin.

These resins may include crystalline and semi-crystalline polymers. In one or more embodiments, these resins may be characterized by a crystallinity of at least 25% by weight, in other embodiments at least 30% by weight, and in other embodiments at least 35% by weight. Crystallinity may be determined by dividing the heat of fusion of a sample by the heat of fusion of a 100% crystalline polymer, which is assumed to be 209 joules/gram for polypropylene or 350 joules/gram for polyethylene. Where the thermoplastic resin of one or more embodiments is propylene-based, the resins may be characterized by a heat of fusion of at least 50 J/g, in other embodiments in excess of 75 J/g, and in other embodiments in excess of 100 J/g. Where the thermoplastic resins of one or more embodiments are polyethylene-based, they may be characterized by a heat of fusion of at least 85 J/g, in other embodiments at least 100 J/g, and in other embodiments at least 130 J/g.

In one or more embodiments, useful thermoplastic resins may be characterized by an $M_w$ of from about 50 to about 2,000 kg/mole, and in other embodiments from about 100 to about 600 kg/mole. They may also be characterized by a $M_n$ of about 25 to about 1,000 kg/mole, and in other embodiments about 50 to about 300 kg/mole, as measured by GPC with polystyrene standards.

In one or more embodiments, these thermoplastic resins can have a MFR (ASTM D-1238, 2.16 dg @ 230° C.) of about 0.2 to 5,000 dg/min, in other embodiments from about 5 to about 500 dg/min, and in other embodiments from about 10 to about 100 dg/min.

In one or more embodiments, these thermoplastic resins can have a $T_m$ that is from about 110° C. to about 250° C., in other embodiments from about 155° C. to about 170° C., and in other embodiments from about 160° C. to about 165° C. They may have a $T_g$ of from about −10 to about 10° C., in other embodiments from about −3 to about 5° C., and in other embodiments from about 0° C. to about 2° C. In one or more embodiments, they may have a crystallization temperature ($T_c$) of at least about 75° C., in other embodiments at least about 95° C., in other embodiments at least about 100° C., and in other embodiments at least 105° C., with one embodiment ranging from 105° C. to 115° C.

Exemplary thermoplastic polymers include crystalline, semi-crystalline, and crystallizable polyolefins, olefin copolymers, and non-olefin resins. The thermoplastic resins may be formed by polymerizing ethylene or α-olefins such as propylene, 1-butene, 1-hexene, 1-octene, 2-methyl-1-propene, 3-methyl-1-pentene, 4-methyl-1-pentene, 5-methyl-1-hexene, and mixtures thereof. Copolymers of ethylene and propylene and ethylene and/or propylene with another α-olefin such as 1-butene, 1-hexene, 1-octene, 2-methyl-1-propene, 3-methyl-1-pentene, 4-methyl-1-pentene, 5-methyl-1-hexene or mixtures thereof is also contemplated. Specifically included are the reactor, impact, and random copolymers of propylene with ethylene or the higher α-olefins, described above, or with $C_{10}$-$C_{20}$ diolefins. Comonomer contents for these propylene copolymers may be from 1% to about 30% by weight of the polymer, for example, see U.S. Pat. No. 6,867,260 B2. Copolymers available under the tradename VISTAMAXX™ (ExxonMobil) are specifically included. Other polyolefin copolymers may include copolymers of olefins with styrene such as styrene-ethylene copolymer or polymers of olefins with α,β-unsaturated acids, α,β-unsaturated esters such as polyethylene-acrylate copolymers. Non-olefin thermoplastic polymers may include polymers and copolymers of styrene, α,β-unsaturated acids, α,β-unsaturated esters, and mixtures thereof. For example, polystyrene, polyacrylate, and polymethacrylate may be used. Blends or mixtures of two or more polyolefin thermoplastics such as described herein, or with other polymeric modifiers, are also suitable in accordance with this invention. Useful thermoplastic polymers may also include impact and reactor copolymers.

The thermoplastic polymers may be synthesized by using an appropriate polymerization technique known in the art such as, but not limited to, the conventional Ziegler-Natta type polymerizations, and catalysis employing single-site organometallic catalysts including, but not limited to, metallocene catalysts.

In one embodiment, the thermoplastic resin includes a homopolymer of a high-crystallinity isotactic or syndiotactic polypropylene. This polypropylene can have a density of from about 0.85 to about 0.91 g/cc, with the largely isotactic polypropylene having a density of from about 0.90 to about 0.91 g/cc. Also, high and ultra-high molecular weight polypropylene that has a fractional melt flow rate can be employed. In one or more embodiments, polypropylene resins may be characterized by a MFR (ASTM D-1238; 2.16 dg @ 230° C.) that is less than or equal to 10 dg/min, in other embodiments less than or equal to 1.0 dg/min, and in other embodiments less than or equal to 0.5 dg/min.

In one or more embodiments, the thermoset compositions of this invention may include a mineral oil, a synthetic oil, or a combination thereof. These oils may also be referred to as plasticizers or extenders. Mineral oils may include aromatic, naphthenic, paraffinic, and isoparaffinic oils. In one or more embodiments, the mineral oils may be treated or untreated. Useful mineral oils can be obtained under the tradename SUNPAR™ (Sun Chemicals). Others are available under the name PARALUX™ (Chevron).

In one or more embodiments, synthetic oils include polymers and oligomers of butenes including isobutene, 1-butene, 2-butene, butadiene, and mixtures thereof. In one or more embodiments, these oligomers can be characterized by a number average molecular weight ($M_n$) of from about 300 g/mole to about 9,000 g/mole, and in other embodiments from about 700 g/mole to about 1,300 g/mole. In one or more embodiments, these oligomers include isobutenyl mer units. Exemplary synthetic oils include includes tylene, poly(isobutylene-co-butene), polybutadiene, poly(butadiene-co-butene), and mixtures thereof. In one or more embodiments, synthetic oils may include polylinear α-olefins, polybranched α-olefins, hydrogenated polyalphaolefins, and mixtures thereof.

In one or more embodiments, the synthetic oils include synthetic polymers or copolymers having a viscosity in excess of about 20 cp, in other embodiments in excess of about 100 cp, and in other embodiments in excess of about 190 cp, where the viscosity is measured by a Brookfield viscometer according to ASTM D-4402 at 38° C. In these or other embodiments, the viscosity of these oils can be less than 4,000 cp and in other embodiments less than 1,000 cp.

Useful synthetic oils can be commercially obtained under the tradenames Polybutene™ (Soltex; Houston, Tex.), Indopol™ (BP; Great Britain), and Parapol™ (ExxonMobil). Oligomeric copolymers deriving from butadiene and its comonomers are commercially available under the tradename Ricon Resin™ (Sartomer). White synthetic oil is available under the tradename SPECTRASYN™ (ExxonMobil), formerly SHF Fluids (Mobil) and Elevast™ (ExxonMobil). Oils described in U.S. Pat. No. 5,936,028 may also be employed.

In one or more embodiments, the extender oils may include organic esters, alkyl ethers, or combinations thereof including those disclosed in U.S. Pat. Nos. 5,290,866 and 5,397,832. In one or more embodiments, the organic esters and alkyl ether esters may have a molecular weight that is generally less than about 10,000. In one or more embodiments, suitable esters include monomeric and oligomeric materials having an average molecular weight of below about 2,000 and in other embodiments below about 600. In one or more embodiments, the esters may be compatible or miscible with both the poly-alphaolefin and rubber components of the composition; i.e., they may mix with other components to form a single phase. In one or more embodiments, the esters include aliphatic mono- or diesters, or alternatively oligomeric aliphatic esters or alkyl ether esters. In one or more embodiments, the thermoset compositions are devoid of polymeric aliphatic esters and aromatic esters, as well as phosphate esters.

In one or more embodiments, the rubber is vulcanized (i.e., set or crosslinked) with a hydrosilating agent. Hydrosilating agents are typically used in conjunction with a catalyst.

In one or more embodiments, silicon-containing cure systems may include silicon hydride compounds having at least two SiH groups. Silicon hydride compounds that are useful in practicing the present invention include, but are not limited to, methylhydrogenpolysiloxanes, methylhydrogendimethylsiloxane copolymers, alkylmethyl-co-methylhydrogenpolysiloxanes, bis(dimethylsilyl)alkanes, bis(dimethylsilyl)benzene, and mixtures thereof.

In one or more embodiments, the hydrosilating agent includes at least three SiH-containing reactive moieties or substituents that may be defined by the forula:

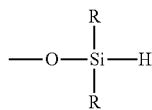

where each R is independently a monovalent organic group or hydrogen. In one or more embodiments, each R is independently a monovalent organic group.

Monovalent organic groups may include hydrocarbyl groups such as, but not limited to, alkyl, cycloalkyl, substituted cycloalkyl, alkenyl, cycloalkenyl, substituted cycloalkenyl, aryl, allyl, substituted aryl, arylalkyl, alkylaryl, and alkynyl groups, each group may contain from 1 carbon atom, or the appropriate minimum number of carbon atoms to form the group, up to 20 carbon atoms. These hydrocarbyl groups may contain heteroatoms such as, but not limited to, nitrogen, oxygen, silicon, sulfur, and phosphorus atoms. In certain embodiments, each R is independently a short-chain hydrocarbyl group. In specific embodiments, each R is a methyl or ethyl group, and in other embodiments each R is a methyl group.

Further, the hydrosilating agents may be characterized by including at least 6 atoms positioned between the silicon atoms of at least 2 of the SiH-containing moieties. In other words, at least 2 of the 3 SiH-containing reactive moieties are spatially separated by at least 6 atoms. In certain embodiments, each of the silicon atoms of the at least 3 SiH-containing reactive moieties are separated by at least 6 atoms. In these or other embodiments, each silicon atom of each SiH-containing moiety is spaced by at least 6 atoms from the nearest silicon atom of the nearest SiH-containing moiety. In particular embodiments, the hydrosilating agent includes at least 3, in other embodiments at least 4, and in other embodiments at least 5 of the SiH-containing reactive moieties. In these or other embodiments, the silicon atoms of the SiH-containing reactive moieties are separated by at least 7, in other embodiments at least 8, and in other embodiments at least 9 atoms.

In one or more embodiments, the hydrosilating agents are characterized by being devoid of or only including limited numbers of certain silicon-containing groups. The particular silicon-containing groups that are limited include those defined by the formulae:

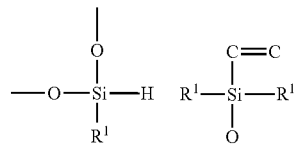

where each $R^1$ independently includes a monovalent organic group. In one or more embodiments, less than 20%, in other embodiments less than 10%, in other embodiments less than 5%, and in other embodiments less than 1% of the SiH-containing groups of the hydrosilating agent are positioned in these groups. In particular embodiments, the hydrosilating agent is substantially devoid of silicon atoms positioned in these groups, where substantially devoid refers to that amount, or less, that does not have an appreciable impact on the curing ability of the hydrosilating agent. In these or other embodiments, the hydrosilating agent is devoid of silicon atoms positioned in these groups.

In one or more embodiments, useful hydrosilating agents may be characterized by an activity of from about 3 to about 80, in other embodiments from about 4 to about 60, in other embodiments from about 5 to about 50, and in other embodiments from about 8 to about 40, where the activity is a measure of the number of hydride groups (i.e., equivalents of hydride groups) per kilogram of hydride compound.

In one or more embodiments, useful hydrosilating agents include those defined by the formula:

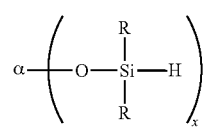

where each R is independently a monovalent organic group or hydrogen, where a is a moiety containing a sufficient number of atoms to allow at least 2 of the SiH-containing groups to be spatially separated by at least 6 atoms, and x is an integer of at least 3.

For example, in particular embodiments, α may include a Q group. In these or other embodiments, the hydrosilating agent may include at least 3 repeat units defined by the formula:

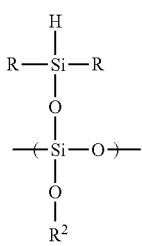

where each R is independently a monovalent organic group or hydrogen, and each $R^2$ is independently a monovalent organic group or a silicon-containing moiety such as a silicon hydride group.

In specific embodiments, the hydrosilating agent may include a resin defined by the formula:

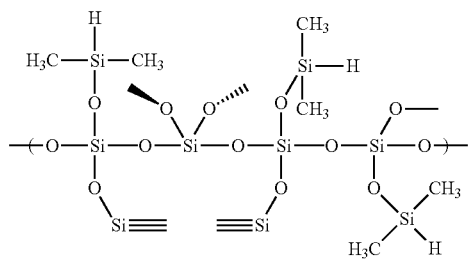

In one or more embodiments, these hydrosilating agents may be characterized by a molecular weight of from about 200 to about 800,000 g/mole, in other embodiments from about 300 to about 300,000 g/mole, and in other embodiments from about 400 about 150,000 g/mole.

Specific examples of hydrosilating agents where a includes a Q resin, which may also be referred to as HQ-type resins or hydride-modified silica Q resins, include those compounds that are commercially available under the tradename MQH-9™ (Clariant LSM, Inc.), which is a hydride-modified silica Q resin characterized by a molecular weight of 900 g/mole and an activity of 9.5 equivalents/kg; HQM 105™ (Gelest, Inc.), which is a hydride modified silica Q resin characterized by a molecular weight of 500 g/mole and an activity of 8-9 equivalents/kg; and HQM 107™ (Gelest, Inc), which is a hydride-modified silica Q resin characterized by a molecular weight of 900 g/mole and an activity of 8-9 equivalents/kg.

Other examples of a moieties include hydrocarbon polymer chains including branched polymer chains and dendritic polymers. These polymer or polymer chains may include hetero atoms including silicon atoms. For example, in one embodiment where a includes a branched hydrocarbon chain, the hydrosilating agent may be defined by the formula:

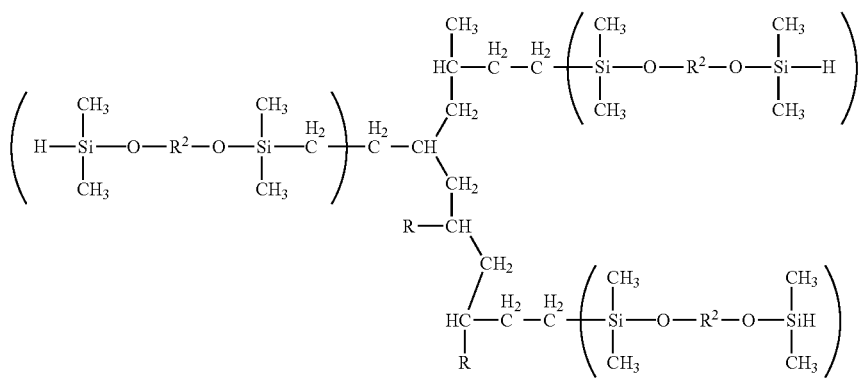

where each R is independently a monovalent organic group and each $R^2$ is independently a divalent organic group. In one or more embodiments, divalent organic groups include a hydrocarbylene group or substituted hydrocarbylene group such as, but not limited to, alkylene, cycloalkylene, substituted alkylene, substituted cycloalkylene, alkenylene, cycloalkenylene, substituted alkenylene, substituted cycloalkenylene, arylene, and substituted arylene groups, with each group preferably containing from 1 carbon atom, or the appropriate minimum number of carbon atoms to form the group, up to about 20 carbon atoms. Substituted hydrocarbylene group includes a hydrocarbylene group in which one or more hydrogen atoms have been replaced by a substituent such as an alkyl group. The divalent organic groups may also contain one or more heteroatoms such as, but not limited to, nitrogen, oxygen, boron, silicon, sulfur, and phosphorus atoms.

Other examples include compounds defined by the formula:

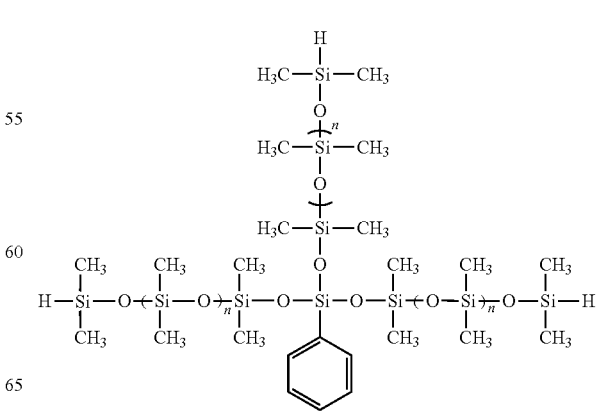

where each n is independently an integer from about 1 to about 1,000, in other embodiments from about 2 to about 100, and in other embodiments from about 3 to about 20.

Other examples include compounds defined by the formula:

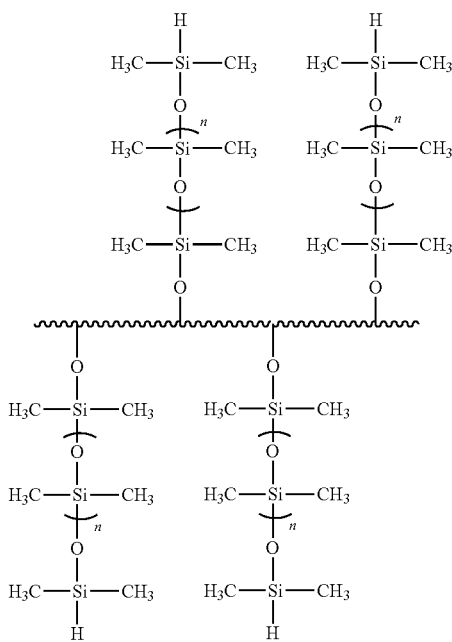

where ∿∿∿ is a polymer chain, and each n is independently an integer from about 0 to about 1,000, in other embodiments from about 1 to about 100, and in other embodiments from about 2 to about 20. In one or more embodiments, the polymer chain includes a polymer chain deriving from the polymerization of conjugated diene monomer optionally together with comonomer such as vinyl aromatic monomer.

Still other examples include compounds defined by the formula:

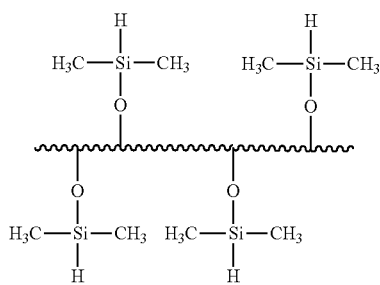

where ∿∿∿ is a polymer chain.

Useful catalysts include those compounds or molecules that can catalyze the hydrosilation reaction between a reactive SiH-containing moiety or substituent and a carbon-carbon bond such as a carbon-carbon double bond. Also, in one or more embodiments, these catalysts may be soluble within the reaction medium. Types of catalysts include transition metal compounds including those compounds that include a Group VIII metal. Exemplary Group VIII metals include palladium, rhodium, germanium, and platinum. Exemplary catalyst compounds include chloroplatinic acid, elemental platinum, chloroplatinic acid hexahydrate, complexes of chloroplatinic acid with sym-divinyltetramethyldisiloxane, dichloro-bis (triphenylphosphine) platinum (II), cis-dichloro-bis(acetonitrile) platinum (II), dicarbonyldichloroplatinum (II), platinum chloride, and platinum oxide, zero valent platinum metal complexes such as Karstedt's catalyst, solid platinum supported on a carrier (such as alumina, silica or carbon black), platinum-vinylsiloxane complexes (e.g., $Pt_n(ViMe_2SiOSiMe_2Vi)_n$ and $Pt[(MeViSiO)_4]_m)$), platinum-phosphine complexes (e.g., $Pt(PPh_3)_4$ and $Pt(PBU_3)_4)$), and platinum-phosphite complexes (e.g., $Pt[P(Oph)_3]_4$ and $Pt[P(Obu)_3]_4)$), wherein Me represents methyl, Bu represents butyl, Vi represents vinyl and Ph represents phenyl, and n and m represent integers. Others include $RhCl(PPh_3)_3$, $RhCl_3$, $Rh/Al_2O_3$, $RuCl_3$, $IrCl_3$, $FeCl_3$, $AlCl_3$, $PdCl_2 \cdot 2H_2O$, $NiCl_2$, $TiCl_4$, and the like.

In one or more embodiments, the catalysts may be employed in conjunction with a catalysts inhibitor. Useful inhibitors include those compounds that stabilize or inhibit rapid catalyst reaction or decomposition. Exemplary inhibitors include olefins that are stable above 165° C. Other examples include 1,3,5,7,-tetravinyltetramethylcyclotetrasiloxane.

Those skilled in the art will be able to readily select an appropriate amount of hydrosilating agent to effect a desired cure. In one or more embodiments, the amount of hydrosilating agent employed may be expressed in terms of the ratio of silicon hydride equivalents (i.e., number of silicon hydride groups) to the equivalents of vinyl double bonds (e.g., number of diene-derived units on the polymer). In certain embodiments, a deficiency of silicon hydride is employed. In other embodiments, an excess of silicon hydride is employed. In one or more embodiments, the ratio of equivalents of silicon hydride to equivalents of vinyl bonds on the rubber is from about 0.7:1 to about 10:1, in other embodiments from about 0.95:1 to about 7:1, in other embodiments from 1:1 to 5:1, and in other embodiments from 1.5:1 to 4:1.

Those skilled in the art will be able to readily select an appropriate amount of catalyst to effect a desired cure. In one or more embodiments, from about 0.00007 parts by weight to about 0.01 parts by weight, in other embodiments from about 0.0001 parts by weight to about 0.0005 parts by weight, and in other embodiments from about 0.0005 parts by weight to about 0.001 parts by weight catalyst is employed per 100 parts by weight of rubber.

In addition to the rubber, thermoplastic resins, and optional processing additives, the thermoset compositions of this invention may optionally include reinforcing and non-reinforcing fillers, antioxidants, stabilizers, rubber processing oil, lubricants, anti-blocking agents, anti-static agents, waxes, foaming agents, pigments, flame retardants and other processing aids known in the rubber compounding art. These additives can comprise up to about 50 weight percent of the total composition. Fillers and extenders that can be utilized include conventional inorganics such as calcium carbonate, clays, silica, talc, titanium dioxide, carbon black and the like. In one or more embodiments, the thermoset compositions of the present invention are devoid or substantially devoid of carbon black.

The thermoset compositions of the present invention may be prepared by first preparing a mixture of the rubber and the thermoplastic resin. This mixture may be formed by introducing the rubber and thermoplastic resin within a conventional mixing apparatus such as a Banbury mixer. The oil and other constituents (e.g. curatives) may be introduced at the time that the rubber and plastic are introduced or they may be subsequently added. In particular embodiments, a multi-stage mixing process is employed whereby the rubber and thermoplastic resin (optionally together with the oil) are introduced and mixed under relatively high shear (e.g., 20 to about 150 rpm) at a temperature above the melt temperature of the thermoplastic resin (e.g., at a temperature of about 160 to about 200° C.). Once sufficient mixing has been achieved, the hydrosilating agent and catalyst can be subsequently added and the composition is mixed at lower temperatures (e.g., 50 to about 100° C.) in order to minimize crosslinking.

In one or more embodiments, after appropriate mixing of rubber, thermoplastic resin, and curative has been achieved, the resulting vulcanizable composition can be fabricated into a desirable uncured shape and then subsequently cured under curing conditions. For example, the vulcanizable composition can be placed in a mold or press, and then the vulcanizable composition can be heated to temperatures (e.g., 140 to about 250° C.) to effect vulcanization or curing of the rubber. In other embodiments, the vulcanizable composition can be fabricated into a film that can subsequently be cured by heating the film (e.g., 40 to about 120° C.).

The thermoset compositions of this invention are useful for making a variety of articles such as weather seals, hoses, belts, gaskets, moldings, boots, elastic fibers and like articles. They are particularly useful for making articles by blow molding, extrusion, injection molding, thermo-forming, elasto-welding and compression molding techniques. More specifically, they are useful for making vehicle parts such as weather seals, brake parts such as cups, coupling disks, and diaphragm cups, boots for constant velocity joints and rack and pinion joints, tubing, sealing gaskets, parts of hydraulically or pneumatically operated apparatus, o-rings, pistons, valves, valve seats, valve guides, and other elastomeric polymer based parts or elastomeric polymers combined with other materials such as metal/plastic combination materials. Also contemplated are transmission belts including V-belts, toothed belts with truncated ribs containing fabric faced V's, ground short fiber reinforced V's or molded gum with short fiber flocked V's.

Exemplary Embodiments

Paragraph A: A rubber composition comprising a cured rubber and thermoplastic resin, where the thermoplastic resin is in the form of discrete domains dispersed within a continuous phase of the cured rubber, and where the cured rubber includes silicon-containing crosslinks.

Paragraph B: The composition of paragraph A, where the silicon-containing crosslinks include at least 2 silicon atoms per crosslink with at least 6 atoms separating each silicon atom within the crosslink.

Paragraph C: The composition of paragraphs A-B, where the thermoplastic resin is polypropylene.

Paragraph D: The composition of paragraphs A-C, where the cured rubber is the crosslinked product of a propylene-based elastomer including at least 5% and up to 35% ethylene-derived units and at least 0.5% and up to 11% diene-derived units, and where the propylene-based elastomer is characterized by a heat of fusion (ASTM E 793) of less than 80 J/g.

Paragraph E: The composition of paragraphs A-D, where the propylene-based elastomer is characterized by a melting point that is less than 110° C. and at least 25° C.

Paragraph F: The composition of paragraphs A-E, where the composition includes greater than 3 parts by weight and less than 60 parts by weight polypropylene per 100 parts by weight rubber.

Paragraph G: The composition of paragraphs A-F, where the polypropylene has a melting temperature that is greater than 110° C.

Paragraph H: The composition of paragraphs A-G, where the polypropylene has a heat of fusion (ASTM E 793) that is greater than 80 J/g.

Paragraph I: The composition of paragraphs A-H, where the composition is substantially devoid of mineral filler.

Paragraph J: The composition of paragraphs A-I, where the composition is substantially devoid of carbon black.

Paragraph K: The composition of paragraphs A-J, where the propylene-based elastomer includes diene units that derive from 5-ethylidene-2-norbornene.

Paragraph L: The composition of paragraphs A-K, where the propylene-based elastomer includes diene units that derive from 5-vinyl-2-norbornene.

Paragraph M: A process for forming a thermoset composition, the process comprising the steps of: (i) combining polypropylene, a propylene-based elastomer, a hydrosilating agent, and a catalyst for the hydrosilating agent to form a crosslinkable mixture; and (ii) activating the hydrosilating agent to crosslink the propylene-based elastomer, where the propylene-based elastomer includes at least 5% and up to 35% ethylene-derived units and at least 0.5% and up to 11% diene-derived units, and where the propylene-based elastomer is characterized by a heat of fusion (ASTM E 793) of less than 80 J/g and a melting temperature of less than 110° C., where the polypropylene has a melting temperature that is greater than 110° C. and a heat of fusion (ASTM E 793) of greater than 80 J/g, and where the hydrosilating agent is a compound including at least 3 silicon hydride groups defined by the formula:

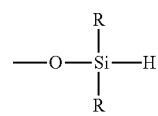

where each R is independently a monovalent organic group or hydrogen, and where the silicon atoms of the respective silicon hydride groups are spatially separated by at least 6 atoms, to thereby form a thermoset composition including discrete domains of polypropylene dispersed within a continuous phase of the crosslinked rubber.

Paragraph N: The composition of paragraph M, where the mixture includes greater than 3 parts by weight and less than 60 parts by weight polypropylene per 100 parts by weight rubber.

Paragraph O: The composition of paragraph M-N, where the propylene-based elastomer includes diene units that derive from 5-ethylidene-2-norbornene.

Paragraph P: The composition of paragraph M-O, where the propylene-based elastomer includes diene units that derive from 5-vinyl-2-norbornene.

Paragraph Q: A process for forming a thermoset composition, the process comprising the steps of (i) combining thermoplastic resin, rubber, a hydrosilating agent, and a catalyst for the hydrosilating agent to form a crosslinkable mixture; and (ii) activating the hydrosilating agent to crosslink the rubber to thereby form a thermoset composition including discrete domains of thermoplastic resin dispersed within a continuous phase of the crosslinked rubber.

Example

Samples 1-4

Four vulcanizable compositions were prepared by using the ingredients set forth in Table I. The compositions were prepared by employing a two-pass mixing technique whereby the rubber, thermoplastic resin, and antioxidants were first mixed for 4 minutes at 165° C. and 40 r.p.m. Following initial mixing, a second pass mix was performed whereby the cure system (curative and catalyst) was added and mixing continued for 9 minutes at 60° C. and 20 r.p.m.

TABLE I

| Ingredients | Sample | | | |
| --- | --- | --- | --- | --- |
| | 1 | 2 | 3 | 4 |
| First Pass | | | | |
| Propylene-based Rubber | 100 | 95 | 90 | 80 |
| Polypropylene | — | 5 | 10 | 20 |
| Irganox 1010 | 0.75 | 0.75 | 0.75 | 0.75 |
| DSTDD 1700 | 0.25 | 0.25 | 0.25 | 0.25 |
| Second Pass | | | | |
| MQH-9 | 1.5 | 1.5 | 1.5 | 1.5 |
| PC085 | 0.05 | 0.05 | 0.05 | 0.05 |
| Properties | | | | |
| MDR Max. Torque @ 200° C. (lb-in) | 9.5 | 9 | 8 | 7 |
| APA results, post cure | | | | |
| G' (kPa)@ 60° C. | | | | |
| @1% | 395 | 663 | 891 | 1440 |
| @3% | 384 | 646 | 868 | 1415 |
| @5% | 380 | 640 | 862 | 1396 |
| @10% | 377 | 632 | 847 | 1357 |
| tan δ @ 60° C. | | | | |
| @1% | 0.086 | 0.074 | 0.074 | 0.063 |
| @3% | 0.096 | 0.079 | 0.079 | 0.078 |
| @5% | 0.097 | 0.081 | 0.081 | 0.079 |
| @10% | 0.094 | 0.081 | 0.082 | 0.080 |
| G' (kPa)@ 180° C. | | | | |
| @1% | 389 | 353 | 322 | 293 |
| @5% | 369 | 336 | 304 | 275 |
| @10% | 359 | 326 | 295 | 267 |
| tan δ @ 180° C. | | | | |
| @1% | 0.040 | 0.065 | 0.089 | 0.112 |
| @5% | 0.053 | 0.082 | 0.107 | 0.132 |
| @10% | 0.062 | 0.092 | 0.118 | 0.142 |

The rubber that was employed was a propylene-based rubber that was prepared in accordance with International Publication No. 2005/0107534 A1 and/or U.S. Pat. No. 6,268,438 B1. The rubber was a terpolymer including units deriving from propylene, ethylene and 5-ethylidene-2-norbornene. The terpolymer was characterized by having a 5-ethylidene-2-norbornene diene content of about 2.1 weight percent, a number average molecular weight of about 69 kg/mole, a polydispersity of about 2.1, and an ethylene content of about 15 weight percent. The polypropylene was obtained under the tradename F008F (Sunoco) and was characterized by an MFR of 0.8 g/10 min. The antioxidants included distearyl thiodipropionate (DSTDP) and Irganox 1010 (Ciba), which is believed to be tetrakis-(methylene-(3,5-di-(tert)-butyl-4-hydrocinnamate))methane. The silicon-containing curative (MQH-9) was a hydride modified silica Q resin obtained under the tradename MQH-9™ (Clariant LSM, Inc.), which was characterized by a molecular weight of about 900 g/mole, an activity of 9.5 equivalents per kilogram, and included about 8.8 silicon hydride functionalities per molecule; at least two of the silicon hydride functionalities were separated by at least 6 atoms. The catalyst was a platinum catalyst that included 2.2 weight percent active platinum catalyst with a cyclicvinylsiloxane ligand obtained under the tradename PC085™.

The respective vulcanizable compositions were formed, by cold pressing, into cylindrical disks having a diameter of about 15 cm and a thickness of about 1 cm. The samples were placed into an Advanced Polymer Analyzer 2000 and cured at 200° C. for 30 minutes at 1% strain and 20 Hz. The analyzer then subjected the samples to strain sweeps at 180° C. at strains of 1, 5, and 10%, and an average of 15 readings is provided in Table I. The samples were then allowed to rest for 15 minutes at 60° C., and then subjected the samples to strain sweeps at 60° C., 10 Hz, and strains of 1, 3, 5, and 10%, and an average of 15 reading is provide in Table I. Also, portions of each composition were cured within a moving die rheometer (MDR) at 200° C. for 15 minutes. The torque, which is indicative of cure or crosslinked density, was measured and the torque at 15 minutes is reported as Max Torque.

The data set forth in Table I and the figures shows that while very large increases in G' are observed with the addition of polypropylene and curing by way of the non-sterically hindered hydrosilating agent, there was observed a small decrease in tan δ. This is highly surprising and in fact contrary to conventional wisdom.

Samples 5-8

The effectiveness of hydrosilating agents employed in this invention (i.e. at least 6 atoms positioned between silicon atoms of at least 2 SiH groups) to cure two distinct rubber compositions was analyzed. The hydrosilating agent was a hydride-modified silica Q resin that was obtained under the tradename HQM 107™ (Gelest, Inc.), was characterized by a molecular weight of about 900 g/mole and an activity of about 8-9 equivalents/kg, and included at least 3 silicon hydride groups that are spatially separated by at least 6 atoms. The first rubber was a poly(ethylene-co-propylene-co-5-ethylidene-2-norbornene)(EPDM) and the second rubber was a propylene-based rubbery copolymer (PP Rubber). Two additional samples were also prepared whereby the poly(ethylene-co-propylene-co-5-ethylidene-2-norbornene) was cured with peroxide to provide additional comparative data.

Initially, the vulcanizable compositions were prepared by mixing the composition within a Brabender mixer, and portions of the compositions were cured and analyzed within a Moving Die Rheometer at 200° C. for 15 minutes. The torque, which is indicative of cure or crosslink density, was measured and recorded, and Table II provides the Max Torque. Samples of each composition were also fabricated into test specimens and cured for 12 minutes at 190° C. (peroxide samples) and 30 min. @ 190° C. for Si—H samples. The test specimens were subjected to mechanical analysis pursuant to ASTM D-412 at 23° C. by using an Instron testing machine, and tension set according to ASTM D-412 after the samples were subjected to accelerated heat aging within an air circulating oven at 110° C. for 70 hours elongated at 25% strain. The results of these latter tests are also provided in Table II.

Each vulcanizable composition included 100 parts by weight rubber, 1.5 parts by weight paraffinic oil, 1 part by weight antioxidant, and a cure system. Those samples cured with the hydrosilating agent included 1.5 parts by weight of the hydrosilating agent and 0.04 parts by weight of a 2.2% platinum catalyst. Where employed, the peroxide was 2,5-dimethyl-2,5-di(t-butylperoxy)hexane that was delivered as a 50% active mixture with the oil, and the peroxide was used in conjunction with 1.4 parts by weight trimethylol propane trimethacrylate as a coagent.

The poly(ethylene-co-propylene-co-5-ethylidene-2-norbornene) was characterized by having a diene content of about 2.2 weight percent, a Mooney viscosity $ML_{(1+4)}$@125° C. of about 44, and an ethylene content of about 57 weight percent, an oil content of 75 phr. The propylene-based rubbery copolymer was prepared in accordance with International Publication No. 2005/0107534 A1 and/or U.S. Pat. No. 6,268,438 B1, and was a terpolymer including units deriving from ethylene, propylene, and 5-ethylidene-2-norbornene with a 5-ethylidene-2-norbornene diene content of about 2.4 weight percent, a Mooney viscosity $ML_{(1+4)}$@125° C. of about 16, and an ethylene content of about 16 weight percent.

TABLE II

| | Samples | | | | | |
|---|---|---|---|---|---|---|
| | 5A<br>C | 5B<br>C | 6A<br>I | 6B<br>I | 7<br>C | 8<br>C |
| | | | Polymer | | | |
| | EPDM | EPDM | Propylene-based Rubber | Propylene-based Rubber | EPDM | EPDM |
| Si—H | 1.5 | 1.5 | 1.51 | 1.5 | | |
| peroxide | | | | | 1.5 | 1.05 |
| stress strain | | | | | | |
| tensile strength (psi) | 300 | 324 | 817 | 832 | 196 | 296 |
| Elongation (%) | 232 | 255 | 488 | 496 | 162 | 332 |
| aged ten. (avg. of 2 samples) | | | | | | |
| 70 hrs @110° C., 25% strain % set | 5.75 | 8.5 | 1.5 | 1.5 | 1.5 | 3.5 |
| MDR | | | | | | |
| ML (in-lb) | 2.3 | 2.1 | 1.07 | 1.13 | 1.84 | 1.65 |
| MH (in-lb) | 13.8 | 12.7 | 9.7 | 10.2 | 19.4 | 16.1 |

The data in Table II shows that the hydrosilating agent does not crosslink the propylene-based rubber as tightly as it crosslinks the EPDM rubber. From this information, one skilled in the art would predict poor mechanical properties and particularly poor tension set. Unexpectedly, the vulcanizates prepared from the propylene-based rubber showed surprisingly good mechanical properties and aged tension set that was markedly better than the compositions prepared from the EPDM. As those skilled in the art would appreciate, the reduction in the level of peroxide curative gave less cure and more set. In contradistinction, the reduced cure of the propylene-based rubber did not provide greater set.

What is claimed is:

1. A rubber composition comprising:
a cured rubber, wherein the cured rubber is a crosslinked product of a propylene-based elastomer including up to 20 wt % ethylene-derived units; and
thermoplastic resin, where the thermoplastic resin is in the form of discrete domains dispersed within a continuous phase of the cured rubber, and where the cured rubber includes silicon-containing crosslinks.

2. The composition of claim 1, where the silicon-containing crosslinks include at least 2 silicon atoms per crosslink with at least 6 atoms separating each silicon atom within the crosslink.

3. The composition of claim 2, where the thermoplastic resin is polypropylene.

4. The composition of claim 3, where the cured rubber is the crosslinked product of a propylene-based elastomer including at least 0.5% and up to 11% diene-derived units, and where the propylene-based elastomer is characterized by a heat of fusion (ASTM E 793) of less than 80 J/g.

5. The composition of claim 4, where the propylene-based elastomer is characterized by a melting point that is less than 110° C. and at least 25° C.

6. The composition of claim 4, where the composition includes greater than 3 parts by weight and less than 60 parts by weight polypropylene per 100 parts by weight rubber.

7. The composition of claim 1, where the polypropylene has a melting temperature that is greater than 110° C.

8. The composition of claim 7, where the polypropylene has a heat of fusion (ASTM E 793) that is greater than 80 J/g.

9. The composition of claim 1, where the composition is substantially devoid of mineral filler.

10. The composition of claim 9, where the composition is substantially devoid of carbon black.

11. The composition of claim 1, where the propylene-based elastomer includes diene units that derive from 5-ethylidene-2-norbornene.

12. The composition of claim 1, where the propylene-based elastomer includes diene units that derive from 5-vinyl-2-norbornene.

13. A process for forming a thermoset composition, the process comprising the steps of:
(i) combining polypropylene, a propylene-based elastomer, a hydrosilating agent, and a catalyst for the hydrosilating agent to form a crosslinkable mixture; and
(ii) activating the hydrosilating agent to crosslink the propylene-based elastomer, where the propylene-based elastomer includes up to 35% up to 20 wt % ethylene-derived units and at least 0.5% and up to 11% diene-derived units, and where the propylene-based elastomer is characterized by a heat of fusion (ASTM E 793) of less than 80 J/g and a melting temperature of less than 110° C., where the polypropylene has a melting temperature that is greater than 110° C. and a heat of fusion (ASTM E 793) of greater than 80 J/g, and where the hydrosilating agent is a compound including at least 3 silicon hydride groups defined by the formula:

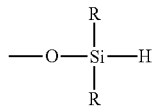

where each R is independently a monovalent organic group or hydrogen, and where the silicon atoms of the respective silicon hydride groups are spatially separated by at least 6 atoms, to thereby form a thermoset composition including discrete domains of polypropylene dispersed within a continuous phase of the crosslinked rubber.

14. The process of claim 13, where the mixture includes greater than 3 parts by weight and less than 60 parts by weight polypropylene per 100 parts by weight rubber.

15. The composition of claim 14, where the propylene-based elastomer includes diene units that derive from 5-ethylidene-2-norbornene.

16. The composition of claim 15, where the propylene-based elastomer includes diene units that derive from 5-vinyl-2-norbornene.

17. A process for forming a thermoset composition, the process comprising the steps of:
  (i) combining thermoplastic resin, rubber, a hydrosilating agent, and a catalyst for the hydrosilating agent to form a crosslinkable mixture; and
  (ii) activating the hydrosilating agent to crosslink the rubber, thereby producing a rubber that is a crosslinked product of a propylene-based elastomer including up to 20 wt % ethylene-derived units, to thereby form a thermoset composition including discrete domains of thermoplastic resin dispersed within a continuous phase of the crosslinked rubber.

* * * * *